US008433956B2

(12) United States Patent
Paaske

(10) Patent No.: US 8,433,956 B2
(45) Date of Patent: Apr. 30, 2013

(54) INSTRUCTION SEQUENCE VERIFICATION TO PROTECT SECURED DATA

(75) Inventor: Timothy R. Paaske, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1478 days.

(21) Appl. No.: 12/020,991

(22) Filed: Jan. 28, 2008

(65) Prior Publication Data

US 2008/0141102 A1 Jun. 12, 2008

Related U.S. Application Data

(63) Continuation of application No. 10/856,882, filed on Jun. 1, 2004, now Pat. No. 7,325,165.

(60) Provisional application No. 60/474,231, filed on May 30, 2003.

(51) Int. Cl.
G06F 11/10 (2006.01)

(52) U.S. Cl.
USPC ............................................. 714/51; 714/807

(58) Field of Classification Search .................... 714/38, 714/732, 733, 736, 51, 807; 726/22, 23
See application file for complete search history.

(56) References Cited

U.S. PATENT DOCUMENTS

| 4,305,124 | A | * | 12/1981 | Marro et al. ............... 712/42 |
| 4,493,078 | A | * | 1/1985 | Daniels ....................... 714/732 |
| 4,688,222 | A | * | 8/1987 | Blum ........................... 714/732 |
| 4,924,469 | A | * | 5/1990 | Tamaru et al. .............. 714/732 |
| 4,929,889 | A | * | 5/1990 | Seiler et al. ................. 714/731 |
| 5,388,253 | A | * | 2/1995 | Geneste et al. .............. 714/38.1 |
| 5,872,794 | A | * | 2/1999 | Cook et al. .................. 714/732 |
| 5,974,529 | A | * | 10/1999 | Zumkehr et al. ............ 712/41 |
| 6,105,154 | A | * | 8/2000 | Wang et al. .................. 714/732 |
| 6,178,534 | B1 | * | 1/2001 | Day et al. ..................... 714/745 |
| 6,223,320 | B1 | | 4/2001 | Dubey et al. |
| 6,311,311 | B1 | * | 10/2001 | Swaney et al. .............. 716/106 |
| 6,314,529 | B1 | * | 11/2001 | Rana ............................. 714/29 |
| 6,697,948 | B1 | | 2/2004 | Rabin et al. |
| 6,925,562 | B2 | | 8/2005 | Gulcu et al. |

(Continued)

OTHER PUBLICATIONS

Dierks, T. and Allen, C., *The TLS Protocol Version 1.0*, Network Working Group Request for Comments No. 2246, from www.ietf.org/rfc/rfc2246.txt, 75 pages, Jan. 1999.

*Primary Examiner* — Stephen M Baker
(74) *Attorney, Agent, or Firm* — Sterne, Kessler, Goldstein & Fox PLLC

(57) ABSTRACT

Intended for an information security application, particularly in networked information systems, the present invention includes two methods and systems for verifying a current performance of a command by a controller. A first cyclic redundancy check (CRC) for the command is prestored in memory. A second CRC for the command is calculated after instructions of the command have been performed by the controller. The first CRC is compared with the second CRC. Preferably, the controller is reset if the first CRC does not match the second CRC. Also, an address of a first instruction of the command is compared with an address of a second instruction of the command to determine if there may be a discontinuity between the first and the second instructions. It is determined if the first instruction is a valid instruction from/to which an instruction sequence of the command can be redirected. Preferably, the controller is reset if the first instruction is not a valid instruction from/to which the instruction sequence can be redirected.

20 Claims, 23 Drawing Sheets

U.S. PATENT DOCUMENTS

| | | |
|---|---|---|
| 7,107,463 B2 | 9/2006 | England et al. |
| 7,325,165 B2 * | 1/2008 | Paaske ................... 714/38.1 |
| 7,353,505 B2 * | 4/2008 | O'Dowd ................. 717/158 |
| 7,506,237 B2 * | 3/2009 | Box et al. ................ 714/779 |
| 2003/0041250 A1 | 2/2003 | Proudler |
| 2003/0051133 A1 | 3/2003 | Pearson |
| 2004/0250126 A1 | 12/2004 | Buer et al. |
| 2005/0240820 A1 * | 10/2005 | Vannerson et al. ........... 714/35 |

\* cited by examiner

INSTRUCTION SEQUENCE VERIFICATION TO PROTECT SECURED DATA

CROSS-REFERENCE TO RELATED APPLICATIONS

This application is a continuation of U.S. patent application Ser. No. 10/856,882, filed Jun. 1, 2004, which claims the benefit of U.S. Provisional Application No. 60/474,231, filed May 30, 2003, each of which is incorporated in its entirety herein by reference.

This application is related to the following commonly owned, co-pending application, which is incorporated in its entirety herein by reference:

"Online Trusted Platform Module," U.S. application Ser. No. 10/452,792, by Buer et al., filed Jun. 3, 2003.

BACKGROUND OF THE INVENTION

1. Field of the Invention

The present invention relates generally to information security and particularly to security in networked information systems.

2. Background Art

For a networked information system to be secured, it must employ mechanisms to limit access to at least some of the data with which the system can interact. Often access to such secured data is controlled by "keys"—data codes that, when processed, allow access to other secured data.

One means by which data can be maintained secured is to limit the number of hardware devices with which the secured data can interact. This can be done by packaging these hardware devices and the secured data within a secured module (or within a secured block on a chip). However, interfacing such a secured module with a networked information system introduces the possibility that the secured data could be communicated outside of the secured module. To maintain security of the data in this environment, the interaction between the secured data and the commands received from the network must be reliably controlled.

However, reliable performance of hardware devices depends upon maintaining the parameters of the devices (e.g., clock frequency, power supply voltages, etc.) and the environment surrounding them (e.g., temperature, electromagnetic radiation, etc.) within their design specifications. Thus, an individual at odds with the purpose of the secured system could cause one or more of the hardware devices to operate outside of their design specifications with the hope that doing this will compromise the integrity of the secured module and facilitate access to the secured data or the keys.

Operating the hardware devices outside of their design specifications can cause instructions to be improperly or incompletely processed. This, in turn, can change the sequence in which instructions are performed. Thus, for a given command, the failure of the instructions to be properly performed in the correct sequence can be indicative of a loss of control of the security of the data within the secured module. What is needed, therefore, is one or more procedures that can verify whether the instructions for a given command are properly performed in the correct sequence.

BRIEF SUMMARY OF THE INVENTION

The present invention relates generally to information security and particularly to security in networked information systems. The present invention comprises two methods and systems for verifying a current performance of a command by a controller.

The first method verifies, with a cyclic redundancy check (CRC), a current performance of a command. A first CRC for the command is prestored in a memory. A second CRC for the command is calculated after instructions of the command have been performed by the controller. In an embodiment, the first and the second CRCs each can be a function of addresses and codes of the instructions. In another embodiment, each instruction can have a value for a "CRC toggle bit" to indicate whether that instruction is included in the calculation of the second CRC. The first and the second CRCs each can be a function of an address and a code of each instruction in which the value of the CRC toggle bit is one. In yet another embodiment, the command includes a "start CRC" instruction and a "stop CRC" instruction to distinguish the instructions that are included in the calculation of the second CRC. The first CRC is compared with the second CRC. Preferably, the controller is reset if the first CRC does not match the second CRC.

In an embodiment, the first method can distinguish between when the first command is performed properly and when it produces an error. When the command is performed properly, the first CRC is a "first command performed properly CRC" and the second CRC is a "second command performed properly CRC". A "first command produced error CRC" is prestored in memory. When the command produces an error, the second CRC is reset. The sequence of instructions jumps to an address of an error handler instruction of the command. As the second CRC, a "second command produced error CRC" is calculated for the error handler instruction after the error handler instruction has been performed by the controller.

A first routine of the second method verifies, by discontinuity detection, a current performance of a command. An address of a first instruction of the command is compared with an address of a second instruction of the command to determine if there may be a discontinuity between the first and the second instructions. It is determined if the first instruction is a "valid instruction from which an instruction sequence of the command can be redirected" (VIFWISCBR). In an embodiment, the determination is made by checking a value of a "VIFWISCBR toggle bit" of the first instruction. In another embodiment, the determination is made by determining if a third instruction of the command is a "VIFWISCBR identifier" instruction. The third instruction is included in the instruction sequence before the first instruction. Preferably, the controller is reset if the first instruction is not a VIFWISCBR.

A second routine of the second method verifies, by discontinuity detection, a current performance of a command. An address of a first instruction of the command is compared with an address of a second instruction of the command to determine if there may be a discontinuity between the first and the second instructions. It is determined if the second instruction is a "valid instruction to which an instruction sequence of the command can be redirected" (VITWISCBR). In an embodiment, the determination is made by checking a value of a "VITWISCBR toggle bit" of the second instruction. In another embodiment, the determination is made by determining if a third instruction of the command is a "VITWISCBR identifier" instruction. The third instruction is included in the instruction sequence after the second instruction. Preferably, the controller is reset if the first instruction is not a VITWISCBR.

The first system verifies, with a CRC, a current performance of a command. The system comprises a memory, a controller, and a comparer. The memory is configured to store a first CRC for the command. The controller is configured to process instructions of the command. The controller has a CRC module configured to calculate a second CRC for the command after instructions of the command have been performed by the controller. In an embodiment, the CRC module can be configured to receive a value for a CRC toggle bit of an instruction. In another embodiment, the controller can further comprise a logic circuit. The logic circuit is configured to receive a value for a CRC toggle bit of an instruction. The logic circuit is coupled to the CRC module. In yet another embodiment, the CRC module can be configured to receive a start CRC instruction and a stop CRC instruction. The comparer is configured to compare the first CRC with the second CRC. The comparer is coupled to the memory and the controller. The system can further comprise a resetter. The resetter is configured to reset the controller if the first CRC does not match the second CRC. The resetter is coupled to the controller.

A first configuration of the second system verifies, by discontinuity detection, a current performance of a command. The system comprises a memory, a controller, and a comparer. The memory is configured to store an address of a first instruction of the command and an address of a second instruction of the command. The controller is configured to determine if the first instruction is a VIFWISCBR. In an embodiment, the controller can be configured to check a value of a VIFWISCBR toggle bit of the first instruction. In another embodiment, the controller can be configured to determine if a third instruction of the command is a VIFWISCBR identifier instruction. The comparer is configured to compare the address of the first instruction with the address of the second instruction. The comparer is coupled to the memory and the controller. The system can further comprise a resetter. The resetter is configured to reset the controller if the first instruction is not a VIFWISCBR. The resetter is coupled to the controller.

A second configuration of the second system verifies, by discontinuity detection, a current performance of a command. The system comprises a memory, a controller, and a comparer. The memory is configured to store an address of a first instruction of the command and an address of a second instruction of the command. The controller is configured to determine if the second instruction is a VITWISCBR. In an embodiment, the controller can be configured to check a value of a VITWISCBR toggle bit of the second instruction. In another embodiment, the controller can be configured to determine if a third instruction of the command is a VITWISCBR identifier instruction. The comparer is configured to compare the address of the first instruction with the address of the second instruction. The comparer is coupled to the memory and the controller. The system can further comprise a resetter. The resetter is configured to reset the controller if the second instruction is not a VITWISCBR. The resetter is coupled to the controller.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE INVENTION

The present invention relates generally to information security and particularly to security in networked information systems. The present invention comprises two methods and systems for verifying a current performance of a command by a processor. Preferred embodiments of the present invention are described below. While specific configurations and arrangements are discussed, it should be understood that this is done for illustrative purposes only. A person skilled in the relevant art will recognize that other configurations and arrangements can be used without departing from the spirit and scope of the invention. It would be apparent to a person skilled in the relevant art that this invention can also be employed in a variety of other systems, networks, and applications such as, but not limited to, secured intranets, cryptographic applications, nuclear command and control systems, avionic applications, or cable television systems.

Figure 1:
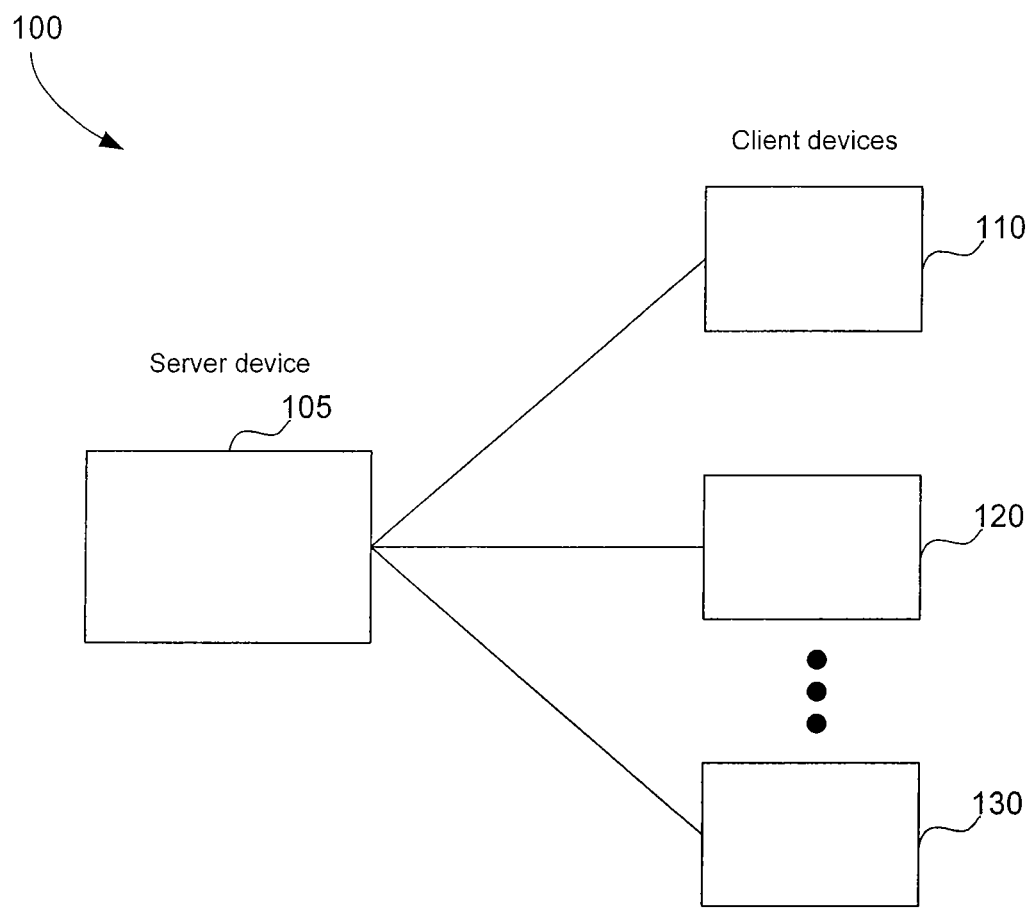
FIG. 1 is a block diagram illustrating a typical topology of a client-server computer network 100.

FIG. 1 illustrates the system context of the present invention. In a network 100, a server or server-like device 105 is shown in communication with a set of clients or client-like devices 110-130. Typically, server 105 provides services and data to each of clients 110-130. Server 105 can include a Hardware Security Module (HSM). One or more of the clients 110-130 each can include an online Trust Platform Module (TPM). Alternatively, clients 110-130 can all be connected to a HSM, which is in turn connected to a separate server.

Figure 2:
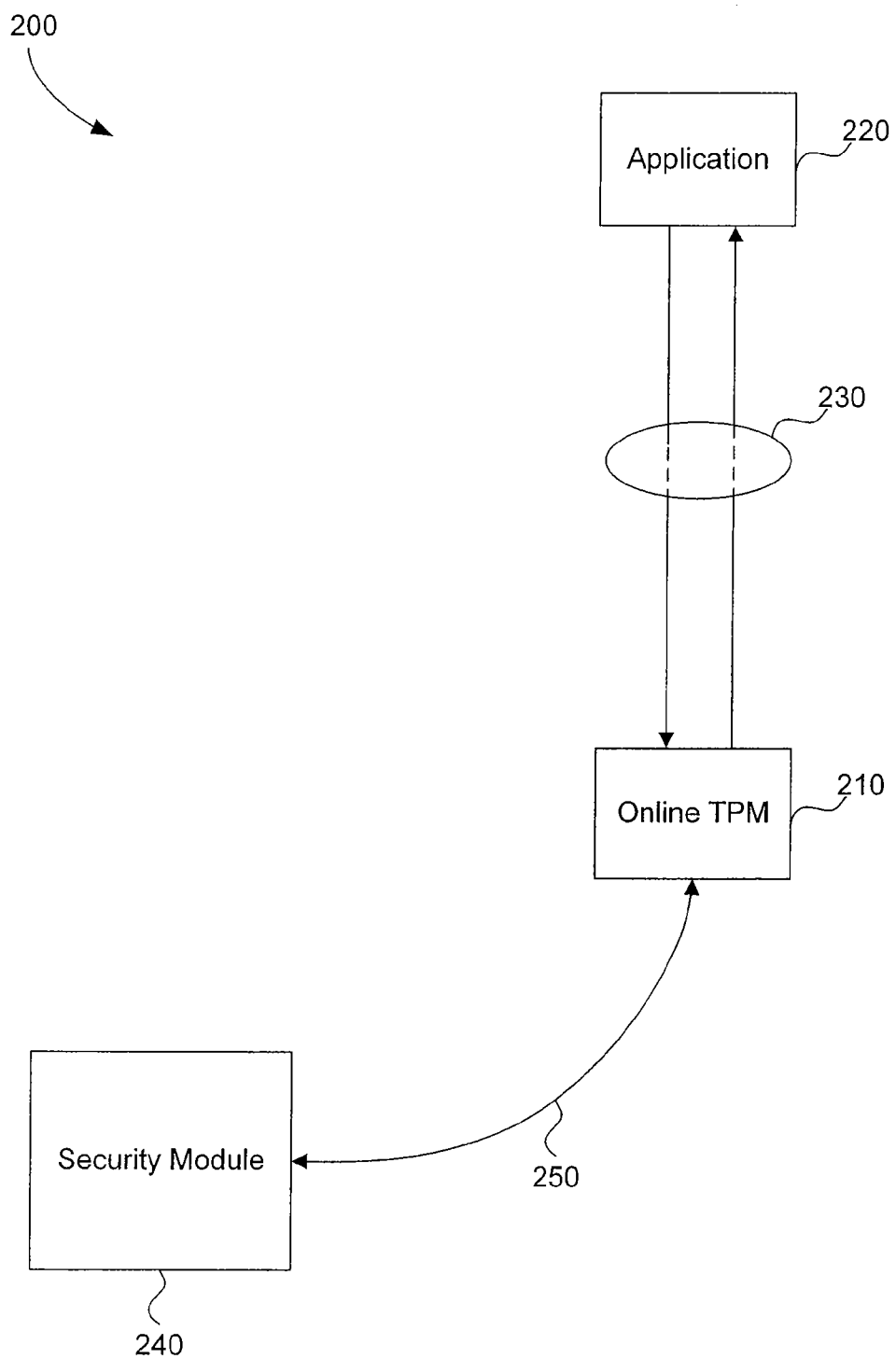
FIG. 2 is a block diagram illustrating a communications channel 200 for an online TPM 210, an application 220, and a HSM 240.

FIG. 2 is a block diagram illustrating a communications channel 200 for an online TPM 210, an application 220, and a HSM 240. Online TPM 210 receives commands from application 220. A command from application 220 can first be processed through a software stack 230 before reaching online TPM 210. Software stack 230 may or may not be trusted. The command is then proxied by the online TPM 210 to HSM 240. HSM 240 can be located elsewhere in network or, alternatively, online TPM 210, application 220, and software stack 230 can be included in a client, such as client 110 of FIG. 1.

Connection 250 implements the communications channel 200 between online TPM 210 and HSM 240. Connection 250 can use the Transport Layer Security (TLS) protocol. Implementation of this protocol provides authentication between HSM 240 and online TPM 210. Version 1.0 of this protocol is described more fully at Dierks, T. and Allen, C, *The TLS Protocol Version* 1.0, Network Working Group Request for Comments No. 2246, January 1999, which is incorporated herein by reference in its entirety.

HSM 240 provides security functionality, such as key management and storage of some or all cryptographic state information on behalf of online TPM 210. After the command is processed by HSM 240, result and status information is returned to online TPM 210 via connection 250. This information may then be forwarded from online TPM 210 to application 220. HSM 240 can be included in a server, such as server 105 of FIG. 1.

Note that multiple online TPMs embodied in multiple respective client machines can connect to a given HSM. In such an arrangement, the HSM provides security functionality to each connected online TPM in the manner just described.

Figure 3:
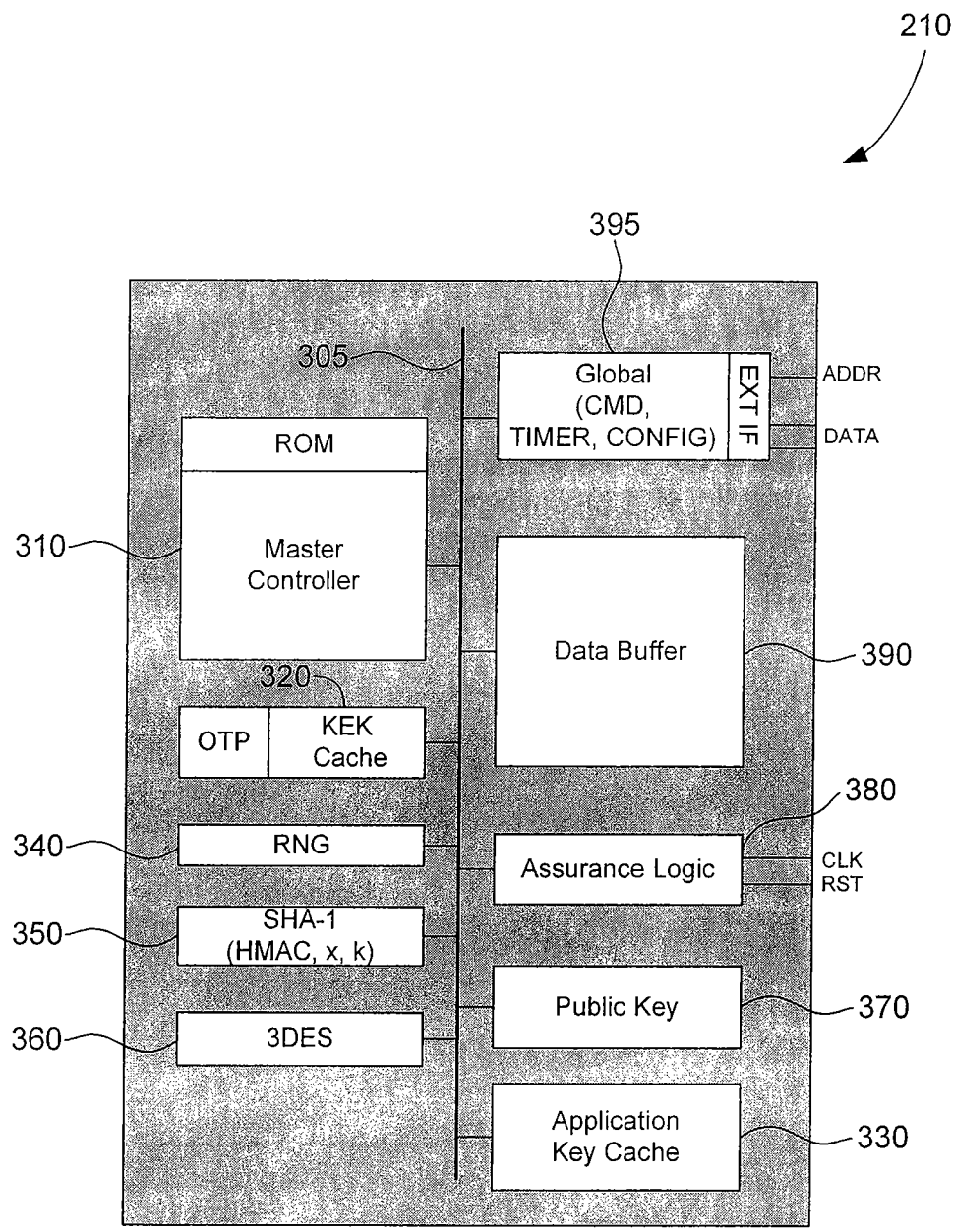
FIG. 3 is a block diagram illustrating an embodiment of online TPM 210.

FIG. 3 is a block diagram illustrating an embodiment of online TPM 210. The illustrated embodiment includes a master controller 310, which includes Read Only Memory (ROM). This embodiment also includes logic and storage for the maintenance of cryptographic keys. A cache for Key Encrypting Keys (KEK) is provided by cache 320, which can be implemented using One Time Programmable (OTP) memory, Non Volatile Memory (NVM) (not shown), or the like. An application key cache is also included in the form of cache 330. This embodiment also includes a Random Number Generator (RNG) 340. Authentication logic is provided by a module 350 that implements the Secure Hash Algorithm (SHA-1) algorithm. Stream encryption is also provided. In the illustrated embodiment, this is implemented with a triple Data Encryption Standard (3DES) module 360. Storage and logic for public key operations is provided in module 370. Logic for ensuring the integrity of security operations is provided by module 380. Interface between online TPM 210 and network 100 is provided by global port 395. The implementation shown also includes a data buffer 390. All of the above components are connected via bus 305.

Figure 4:
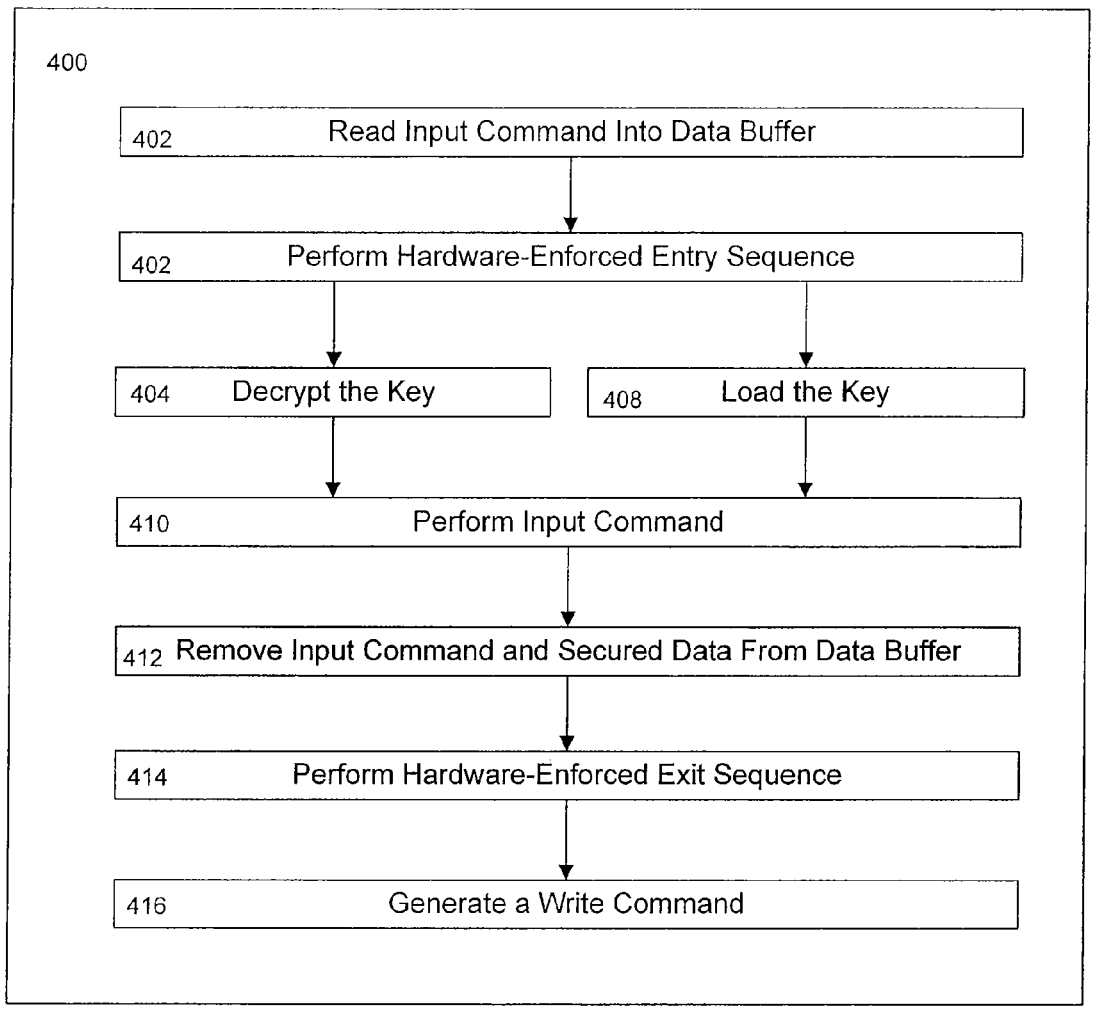
FIG. 4 shows a flow chart of a method 400 by which online TPM 210 controls the interaction between its secured data and commands received via connection 250.
Figure 5A:
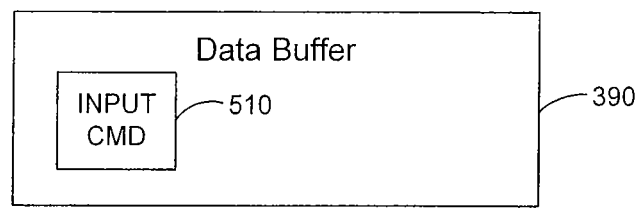
FIGS. 5A through 5C illustrate data buffer 390 at various points in time in the performance of method 400.

FIG. 4 shows a flow chart of a method 400 by which online TPM 210 controls the interaction between its secured data and commands received via connection 250. Initially, in method 400, online TPM 210 is in INSECURE mode so that it can exchange commands via connection 250. At step 402, an input command is read into data buffer 390 via connection 250 through global port 395 and bus 305. FIG. 5A is a block diagram illustrating an input command 510 in data buffer 390.

Figure 5B:
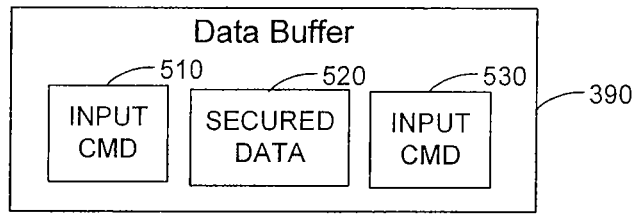

Returning to method 400, at a step 404, a hardware-enforced entry sequence is performed, which places online TPM 210 in SECURE mode so that it cannot exchange commands via connection 250. If input command 510 requires the use of a key to access secured data, then the key can be obtained at a step 406, a step 408, or through an equivalent means as would be recognized to one skilled in the art. If the key was included with input command 510, the key can be decrypted at step 406. Alternatively, at step 408, input command 510 can direct master controller 310 to load the key from a storage location within online TPM 210, such as caches 320 or 330. Once the key is obtained (if it was required), input command 510 is performed at a step 410. As illustrated in FIG. 5B, performing input command 510 causes secured data 520 to be read into data buffer 390 and an output response 530 to be produced and read into data buffer 390.

Figure 5C:
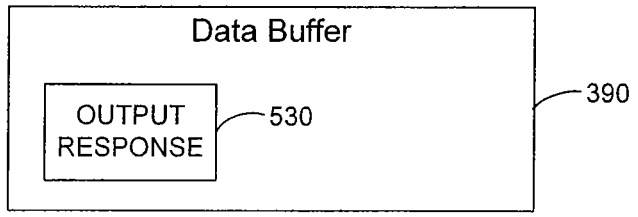

Returning to method 400, production of output response 530 initiates a process at a step 412 whereby input command 510 and secured data 520 are removed from data buffer 390. FIG. 5C illustrates data buffer 390 with just output response 530.

Returning to method 400, at a step 414, a hardware-enforced exit sequence is performed, which places online TPM 210 in INSECURE mode so that it can exchange commands via connection 250. If the product of the performed process is to be communicated via connection 250, then a write command is generated at a step 416.

Although method 400 provides safeguards for controlling the interaction between the secured data of online TPM 210 and the commands received via connection 250, method 400 can be vulnerable to efforts that cause the hardware devices of online TPM 210 to operate outside of their design specifications. Such efforts could cause master controller 310 to perform the steps of method 400 out of sequence such that the hardware-enforced exit sequence (step 414) is performed after input command 510 is processed (step 410), but before secured data 520 is removed from data buffer 390 (step 412). Were this to occur, it would place online TPM 210 in INSECURE mode with secured data 520 still stored in data buffer 390. In such a configuration, it is possible that secured data 520 could be communicated outside of online TPM 210, which would compromise its security.

The present invention, described below, provides two procedures that can verify whether the instructions for a given command are properly performed in the correct sequence by master controller 310. If it is determined that the instructions are improperly performed or that they have been performed in an incorrect sequence, master controller 310 is reset, which places online TPM 210 in SECURE mode, thereby protecting secured data 520.

The present invention assumes that online TPM 210 will process only a finite set of commands and that some of the commands within this finite set are predictable commands—commands that use a specific, limited sequence of instructions. (Examples of unpredictable commands include, but are not limited to, run-time loops, command options, and hardware polling commands, such as random number generation and the use of one-time programmable memory.)

The first procedure of the present invention uses a cyclic redundancy check (CRC) routine to track the performance of instructions and the sequence of instructions within a predictable command. Similar to a checksum, a CRC is an important error detection tool used in communication and data processing systems to detect errors. The CRC is typically a polynomial function. When specific data is input to the CRC, a unique output is produced which can be used to identify the specific data. In the first procedure, instructions of a predictable command are sequentially input to the CRC. The unique output produced by the CRC changes as each sequential instruction is input to the CRC. Preferably, each of the instructions includes both the instruction address and the instruction code so that the CRC is indicative not only of the instructions, but also of their sequence within the predictable command.

Figure 6:
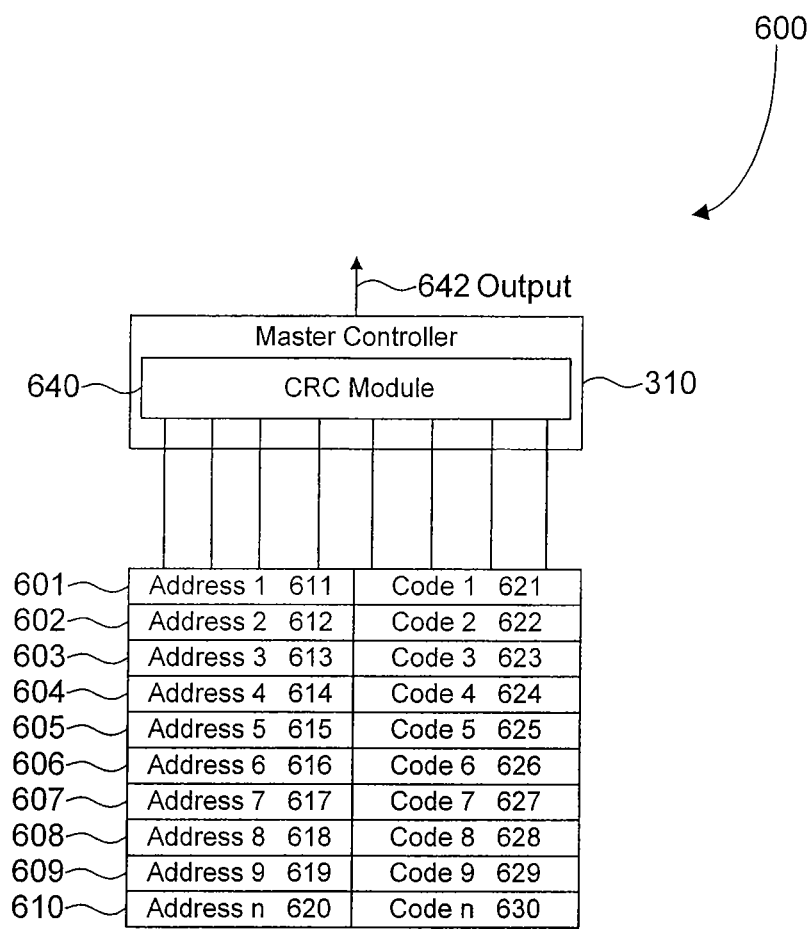
FIG. 6 illustrates a relationship between master controller 310 and a PREDICTABLE COMMAND 600.

FIG. 6 illustrates a relationship between master controller 310 and a PREDICTABLE COMMAND 600. In FIG. 6, master controller 310 includes a CRC module 640. PREDICTABLE COMMAND 600 comprises a sequence of instructions: INSTRUCTION 1 601 through INSTRUCTION n 610. Preferably, each instruction includes an instruction address and instruction code. For example, INSTRUCTION 1 601 includes ADDRESS 1 611 and CODE 1 621, INSTRUCTION 2 602 includes ADDRESS 2 612 and CODE 2 622, etc. Master controller 310 processes each instruction according to its sequence in PREDICTABLE COMMAND 600. Concurrently, each instruction is received as an input to CRC module 640. The CRC at an output 642 of CRC module 640 is initially set to a specific value (such as zero) before the first instruction in the sequence is processed. The CRC at output 642 changes as a function of each instruction. For example, after INSTRUCTION 1 601 has been processed by master controller 310, the CRC at output 642 is a function of INSTRUCTION 1 601 as shown in Eq. (1):

$$CRC=f(ADDRESS\ 1, DATA\ 1).\qquad Eq.\ (1)$$

After INSTRUCTION 2 602 has been processed by master controller 310, the CRC at output 642 is a function of INSTRUCTION 1 601 and INSTRUCTION 2 602 as shown in Eq. (2):

$$CRC=f[ADDRESS\ 2, DATA\ 2, f(ADDRESS\ 1, DATA\ 1)].\qquad Eq.\ (2)$$

The CRC at output 642 continues to change in the manner described above as each instruction is processed by master controller 310. After INSTRUCTION n 610 has been processed by master controller 310, the CRC at output 642 is the CRC for PREDICTABLE COMMAND 600.

In the first procedure of the present invention, a CRC for each predictable command is precalculated and prestored in memory. A CRC is also calculated during a current performance of a predictable command. The CRC calculated during the current performance is compared with the precalculated CRC to determine if instructions of the predictable command have been performed correctly and in the proper sequence.

Figure 7:
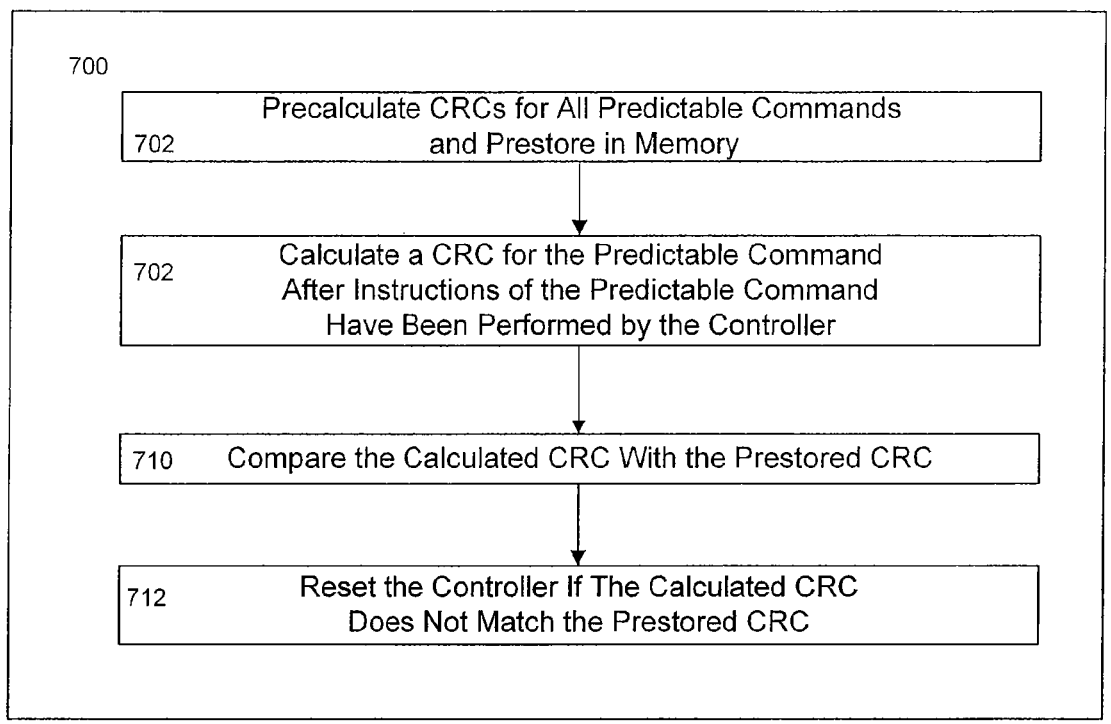
FIG. 7 is a flowchart that illustrates a method 700 of verifying, with a CRC in the manner of the present invention, a current performance of a predictable command.

FIG. 7 is a flowchart that illustrates a method 700 of verifying, with a CRC in the manner of the present invention, a current performance of a predictable command. In method 700, if not already done, at a step 702, CRCs for all of the predictable commands are precalculated and prestored in memory in online TPM 210, preferably in ROM. Subsequently, when online TPM 210 receives a predictable command, at a step 704, a CRC for the predictable command is calculated after instructions of the predictable command have been performed by master controller 310. At a step 706, the calculated CRC is compared with the prestored CRC. At a step 708, if the two CRCs do not match, master controller 310 is reset (which places online TPM 210 in SECURE mode, thereby protecting secured data 520). The skilled artisan will recognize that method 700 can also be performed after each instruction rather than after each command. Therefore, the present invention also includes embodiments in which method 700 is performed in a "per instruction" manner.

Only the deterministic instructions of a predictable command are used to produce the CRCs. Deterministic instructions are characterized by code that will always be executed when the predictable command is processed. Thus, the present invention preferably includes a mechanism to prevent master controller 310 from including non-deterministic instructions in the calculation of a CRC for a predictable command.

Figure 8A:
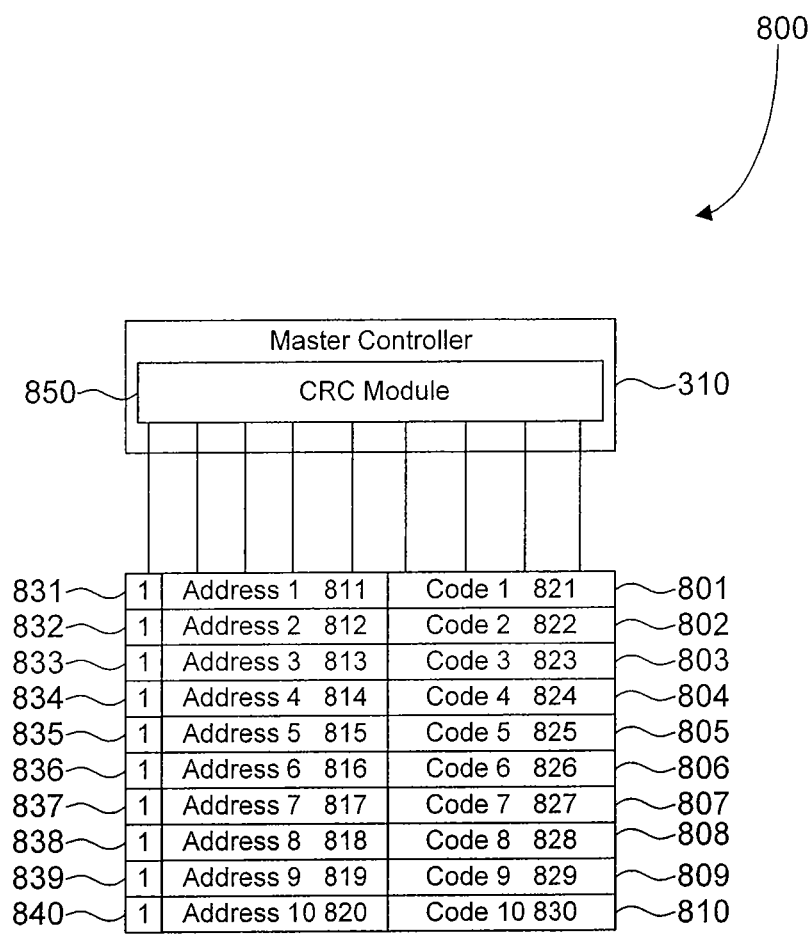
FIG. 8A illustrates a relationship between master controller 310 and a PREDICTABLE COMMAND 800.

In some embodiments, each instruction of a predictable command has a "CRC toggle bit" to indicate whether that instruction is included in the calculation of the CRC for the predictable command. FIG. 8A illustrates a relationship between master controller 310 and a PREDICTABLE COMMAND 800. In FIG. 8A, master controller 310 includes a CRC module 850. Each instruction of PREDICTABLE COMMAND 800 includes a CRC toggle bit. For example, INSTRUCTION 1 801 includes ADDRESS 1 811, CODE 1 821, and CRC TOGGLE BIT 1 831; INSTRUCTION 2 802 includes ADDRESS 2 812, CODE 2 822, and CRC TOGGLE BIT 2 832; etc. In this embodiment, CRC module 850 is configured to receive the value of the CRC toggle bit, which is an "extra" bit in the instruction, to indicate whether that instruction is included in the calculation of the CRC for the predictable command.

For example, because CRC TOGGLE BIT 1 831, CRC TOGGLE BIT 2 832, CRC TOGGLE BIT 3 833, CRC TOGGLE BIT 4 834, CRC TOGGLE BIT 6 836, CRC TOGGLE BIT 7 837, CRC TOGGLE BIT 8 838, and CRC TOGGLE BIT 10 840 each have the value one, INSTRUCTION 1 801, INSTRUCTION 2 802, INSTRUCTION 3 803, INSTRUCTION 4 804, INSTRUCTION 6 806, INSTRUCTION 7 807, INSTRUCTION 8 808, and INSTRUCTION 10 810 are included in the calculation of the CRC for PREDICTABLE COMMAND 800. Because CRC TOGGLE BIT 5 835 and CRC TOGGLE BIT 9 839 each have the value zero, INSTRUCTION 5 805 and INSTRUCTION 9 809 are not included in the calculation of the CRC for PREDICTABLE COMMAND 800.

Figure 8B:
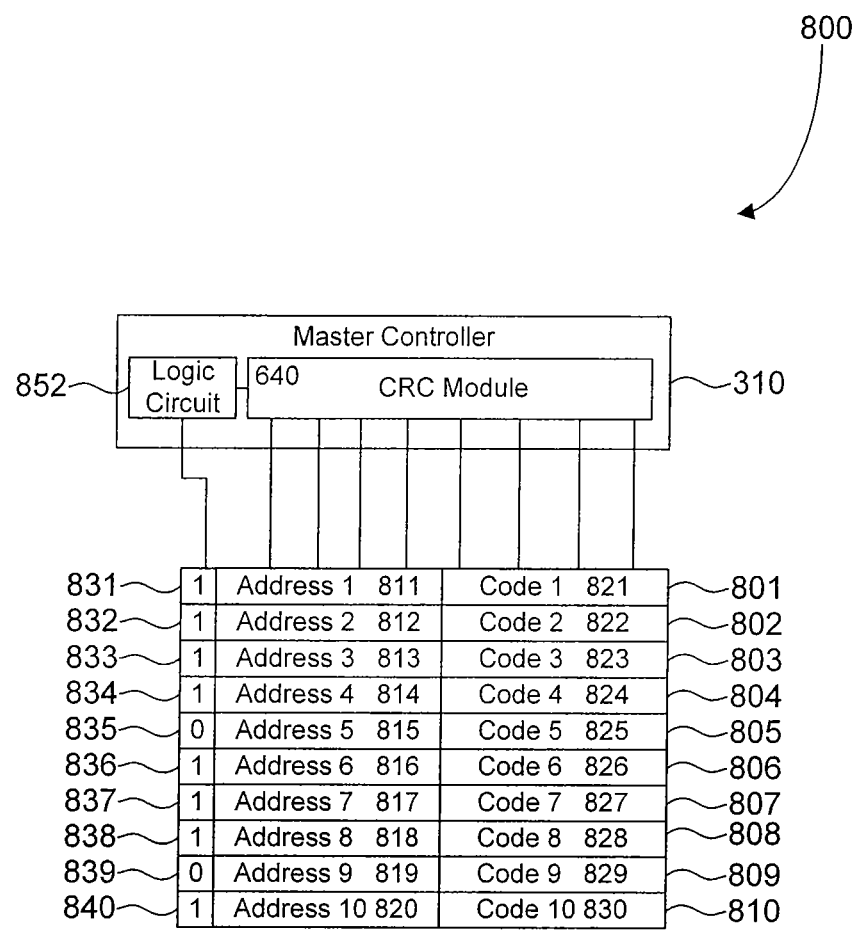
FIG. 8B illustrates another relationship between master controller 310 and PREDICTABLE COMMAND 800.

FIG. 8B illustrates another relationship between master controller 310 and PREDICTABLE COMMAND 800. In FIG. 8B, master controller 310 includes CRC module 640 and a logic circuit 852. In this embodiment, the value of the CRC toggle bit is received by logic circuit 852, which interfaces with CRC module 640 to determine whether the remaining portion of the corresponding instruction (e.g., instruction address and instruction code), which is received by CRC module 640, is included in the calculation of the CRC for PREDICTABLE COMMAND 800.

Figure 8C:
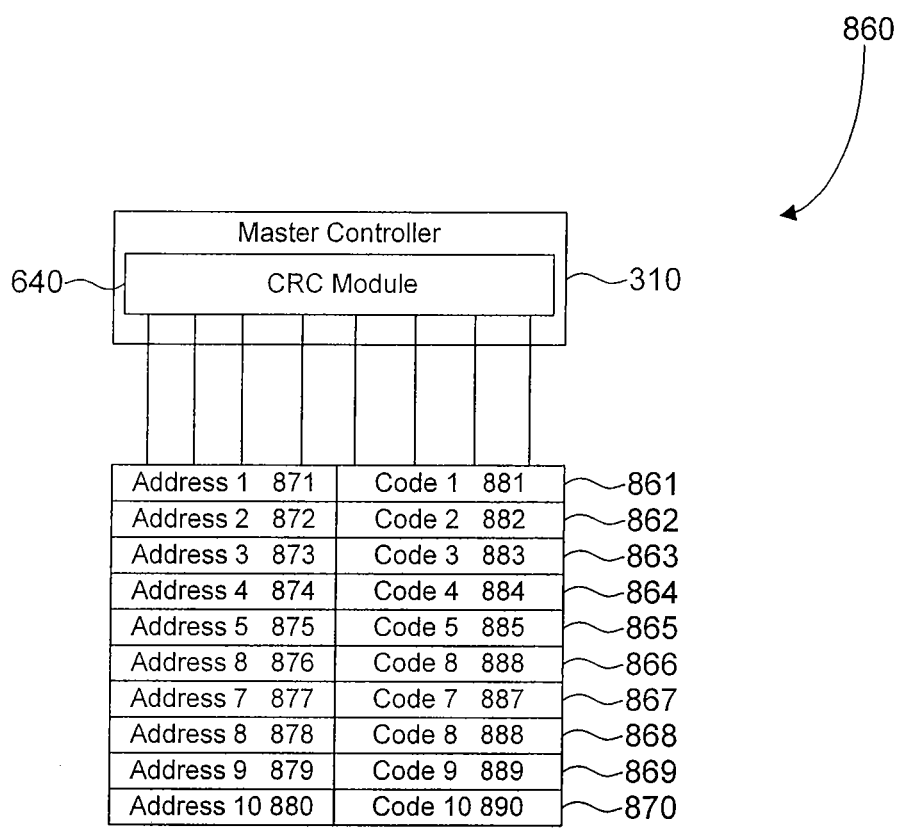
FIG. 8C illustrates a relationship between master controller 310 and a PREDICTABLE COMMAND 860.

In another embodiment, a "start CRC" instruction and a "stop CRC" instruction are included in the sequence of instructions to distinguish those instructions that are included in the calculation of the CRC for the predictable command from those instructions that are not be included. FIG. 8C illustrates a relationship between master controller 310 and a PREDICTABLE COMMAND 860. In FIG. 8C, master controller 310 includes CRC module 640. In PREDICTABLE COMMAND 860, instructions that are included in the calculation of the CRC are preceded by a start CRC instruction and followed by a stop CRC instruction.

For example, INSTRUCTION 1 861 includes ADDRESS 1 871 and CODE 1 881, and CODE 1 881 is a start CRC instruction. INSTRUCTION 2 862 includes ADDRESS 2 872 and CODE 2 882. INSTRUCTION 3 863 includes ADDRESS 3 873 and CODE 3 883. INSTRUCTION 4 864 includes ADDRESS 4 874 and CODE 4 884, and CODE 4 is a stop CRC instruction. INSTRUCTION 5 865 includes ADDRESS 5 875 and CODE 5 885. INSTRUCTION 6 866 includes ADDRESS 6 876 and CODE 6 886, and CODE 6 is a start CRC instruction. INSTRUCTION 7 867 includes ADDRESS 7 877 and CODE 7 887. INSTRUCTION 8 868 includes ADDRESS 8 878 and CODE 8 888. INSTRUCTION 9 869 includes ADDRESS 9 879 and CODE 9 889. INSTRUCTION 10 870 includes ADDRESS 10 880 and CODE 10 890.

INSTRUCTION 1 861 and INSTRUCTION 6 866 "alert" master controller 310 that INSTRUCTION 2 862, INSTRUCTION 3 863, INSTRUCTION 7 867, INSTRUCTION 8 868, INSTRUCTION 9 869, and INSTRUCTION 10 870 are to be included in the calculation of the CRC of PREDICTABLE COMMAND 860. INSTRUCTION 4 864 alerts master controller 310 that INSTRUCTION 5 865 is not to be included in the calculation of the CRC of PREDICTABLE COMMAND 860.

The skilled artisan will recognize other mechanisms by which master controller 310 can be prevented from including non-deterministic instructions in the calculation of a CRC for a predictable command. Therefore, the present invention is not limited to the mechanisms described above.

The first procedure of the present invention also preferably includes a mechanism to distinguish between the situation when a predictable command is properly performed and when it produces an error. Typically, when a command produces an error, a specific "error handler" instruction is performed. Therefore, this situation can be resolved by producing two sets of CRCs for each predictable command: one for when the command is properly performed, the other for when it produces an error. For each predictable command, both CRCs are precalculated and prestored in memory on TPM 210, preferably in ROM.

Figure 9:
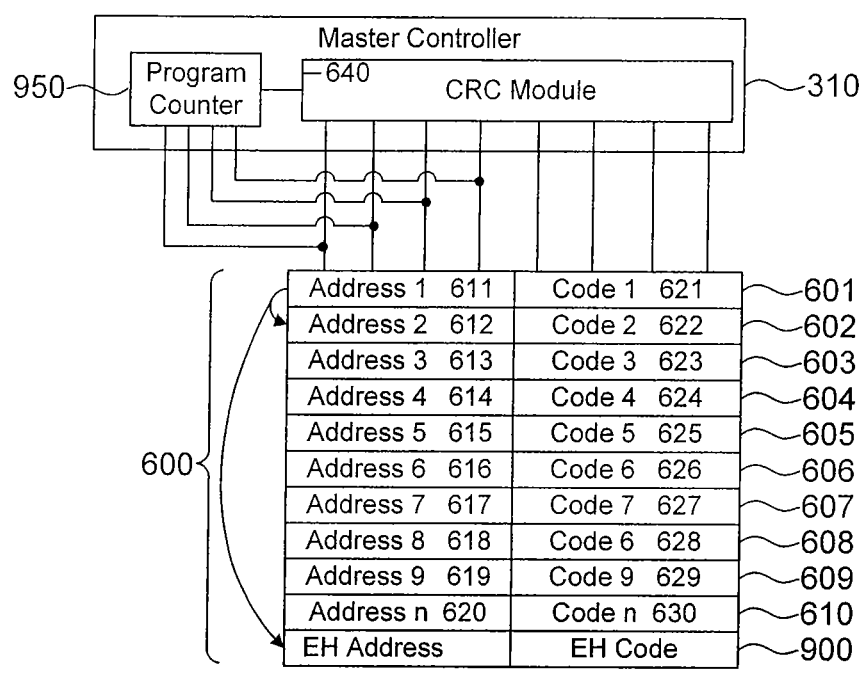
FIG. 9 illustrates a relationship between master controller 310, PREDICTABLE COMMAND 600, and an ERROR HANDLER INSTRUCTION 900.

FIG. 9 illustrates a relationship between master controller 310, PREDICTABLE COMMAND 600, and an ERROR HANDLER INSTRUCTION 900. In FIG. 9, master controller 310 includes CRC module 640 and a program counter 950. For PREDICTABLE COMMAND 600, master controller 310 processes each instruction according to its sequence. After each instruction has been performed, master controller 310 determines if the instruction was performed properly or if an error was produced. If the instruction was performed properly, then master controller 310 causes program counter 950 to increment to an address of the next instruction in PREDICTABLE COMMAND 600. If the instruction produced an error, then master controller 310 causes program counter 950 to jump to an address of ERROR HANDLER INSTRUCTION 900.

For example, after INSTRUCTION 1 601 has been performed, master controller 310 determines if INSTRUCTION 1 601 was performed properly or if an error was produced. If INSTRUCTION 1 601 was properly performed, then master controller 310 causes program counter 950 to increment to an address of INSTRUCTION 2 602 (e.g., ADDRESS 2 612) so that it can be performed. If INSTRUCTION 1 601 produced an error, then master controller 310 causes program counter 950 to jump to an address of ERROR HANDLER INSTRUCTION 900.

Figure 10:
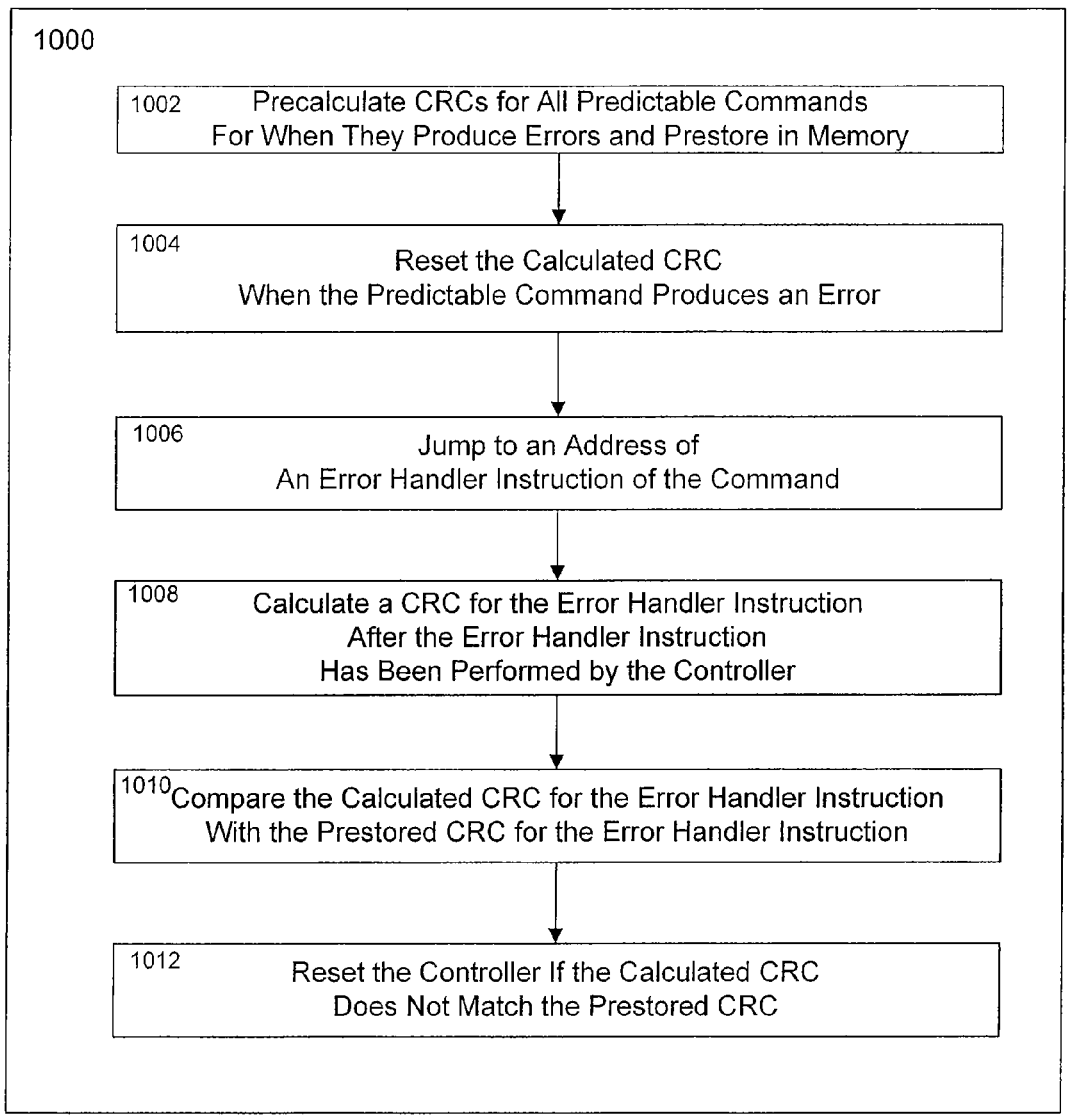
FIG. 10 is a flowchart that illustrates a method 1000 of calculating a CRC when the predictable command produces an error.

FIG. 10 is a flowchart that illustrates a method 1000 of calculating a CRC when the predictable command produces an error. In method 1000, if not already done, at a step 1002, CRCs for all of the predictable commands are precalculated for when they produce errors. These "command produced error" CRCs are prestored in memory in online TPM 210, preferably in ROM. Subsequently, at a step 1004, when the predictable command produces an error, the calculated CRC is reset. Preferably, when a predictable command produces an error, the hardware-enforced exit sequence (step 414) is performed. At a step 1006, the program counter jumps to an address of an error handler instruction of the predictable command. At a step 1008, a CRC for the error handler instruction is calculated after it has been performed by master controller 310. At a step 1010, the calculated CRC is compared with the prestored CRC for the error handler instruction. At a step 1012, if the two CRCs do not match, master controller 310 is reset (which places online TPM 210 in SECURE mode, thereby protecting secured data 520).

The second procedure of the present invention addresses the situation of commands that include instructions that cause the instruction sequence to be redirected. Examples include, but are not limited to, branch instructions, jump instructions, jump-and-link instructions, and jump-and-return instructions. The present invention assumes that, in the absence of these types of instructions, the addresses of instructions within a command increment by a set value for each instruction in the sequence. Thus, where a first instruction and a second instruction are consecutive instructions of a command, the difference in the values between an address of the first instruction and an address of the second instruction should, for most instructions, be the same. Where this is not the case, there may be a discontinuity between the instructions. The potential discontinuity is investigated by determining if the first instruction is a valid instruction from which the instruction sequence can be redirected, determining if the second instruction is a valid instruction to which the instruction sequence can be redirected, or preferably both. If the discontinuity is confirmed, master controller 310 is reset (which places online TPM 210 in SECURE mode, thereby protecting secured data 520).

Figure 11:
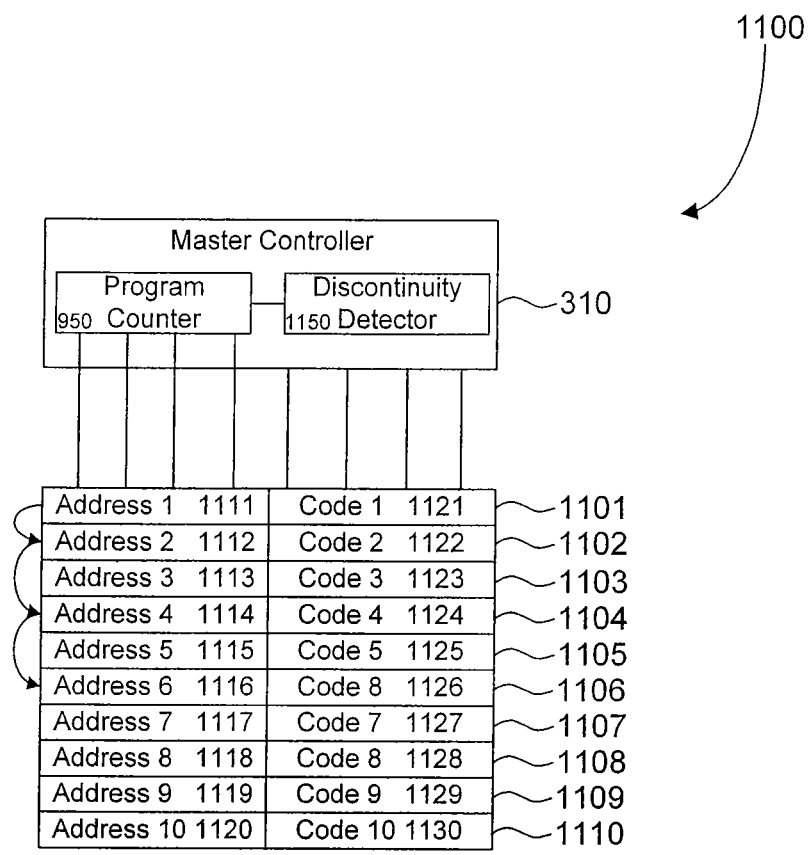
FIG. 11 illustrates a relationship between master controller 310 and a COMMAND 1100.

FIG. 11 illustrates a relationship between master controller 310 and a COMMAND 1100. In FIG. 11, master controller 310 includes program counter 950 and a discontinuity detector 1150. In most cases, master controller 310 processes each instruction according to its sequence in COMMAND 1100. However, COMMAND 1100 includes an instruction from which the instruction sequence is redirected and an instruction to which the instruction sequence is redirected.

For example, INSTRUCTION 1 1101 includes ADDRESS 1 1111 and CODE 1 1121. INSTRUCTION 2 1102 includes ADDRESS 2 1112 and CODE 2 1122, and CODE 2 1122 is an instruction from which the instruction sequence is redirected (for example, under certain circumstances). INSTRUCTION 3 1103 includes ADDRESS 3 1113 and CODE 3 1123. INSTRUCTION 4 1104 includes ADDRESS 4 1114 and CODE 4 1124, and CODE 4 1124 is an instruction to which the instruction sequence is redirected (for example, under certain circumstances). INSTRUCTION 5 1105 includes ADDRESS 5 1115 and CODE 5 1125. INSTRUCTION 6 1106 includes ADDRESS 6 1116 and CODE 6 1126. INSTRUCTION 7 1107 includes ADDRESS 7 1117 and CODE 7 1127. INSTRUCTION 8 1108 includes ADDRESS 8 1118 and CODE 8 1128. INSTRUCTION 9 1109 includes ADDRESS 9 1119 and CODE 9 1129. INSTRUCTION 10 1110 includes ADDRESS 10 1120 and CODE 10 1130.

For example, after INSTRUCTION 1 1101 at ADDRESS 1 1111 has been performed, master controller 310 causes program counter 950 to go to ADDRESS 2 1112 so that INSTRUCTION 2 1102 can be performed. Discontinuity detector 1150 compares the difference in the values between ADDRESS 2 1112 and ADDRESS 1 1111 and determines that there is no discontinuity.

After INSTRUCTION 2 1102 at ADDRESS 2 1112 has been performed, master controller 310 causes program counter 950 to go to ADDRESS 4 1114 so that INSTRUCTION 4 1104 can be performed. Discontinuity detector 1150 compares the difference in the values between ADDRESS 4 1114 and ADDRESS 2 1112 and determines that there may be a discontinuity. Master controller 310 determines that INSTRUCTION 2 1102 is a valid instruction from which the instruction sequence can be redirected and that INSTRUCTION 4 1104 is a valid instruction to which the instruction sequence can be redirected. Therefore, there is no discontinuity.

After INSTRUCTION 4 1104 at ADDRESS 4 1114 has been performed, master controller 310 (incorrectly) causes program counter 950 to go to ADDRESS 6 1116 so that INSTRUCTION 6 1106 can be performed. Discontinuity detector 1150 compares the difference in the values between ADDRESS 6 1116 and ADDRESS 4 1114 and determines that there may be a discontinuity. Master controller 310 determines that INSTRUCTION 4 1104 is not a valid instruction from which the instruction sequence can be redirected and that INSTRUCTION 6 1106 is not a valid instruction to which the instruction sequence can be redirected. Therefore, the discontinuity is confirmed and master controller 310 is reset (which places online TPM 210 in SECURE mode, thereby protecting secured data 520).

Figure 12:
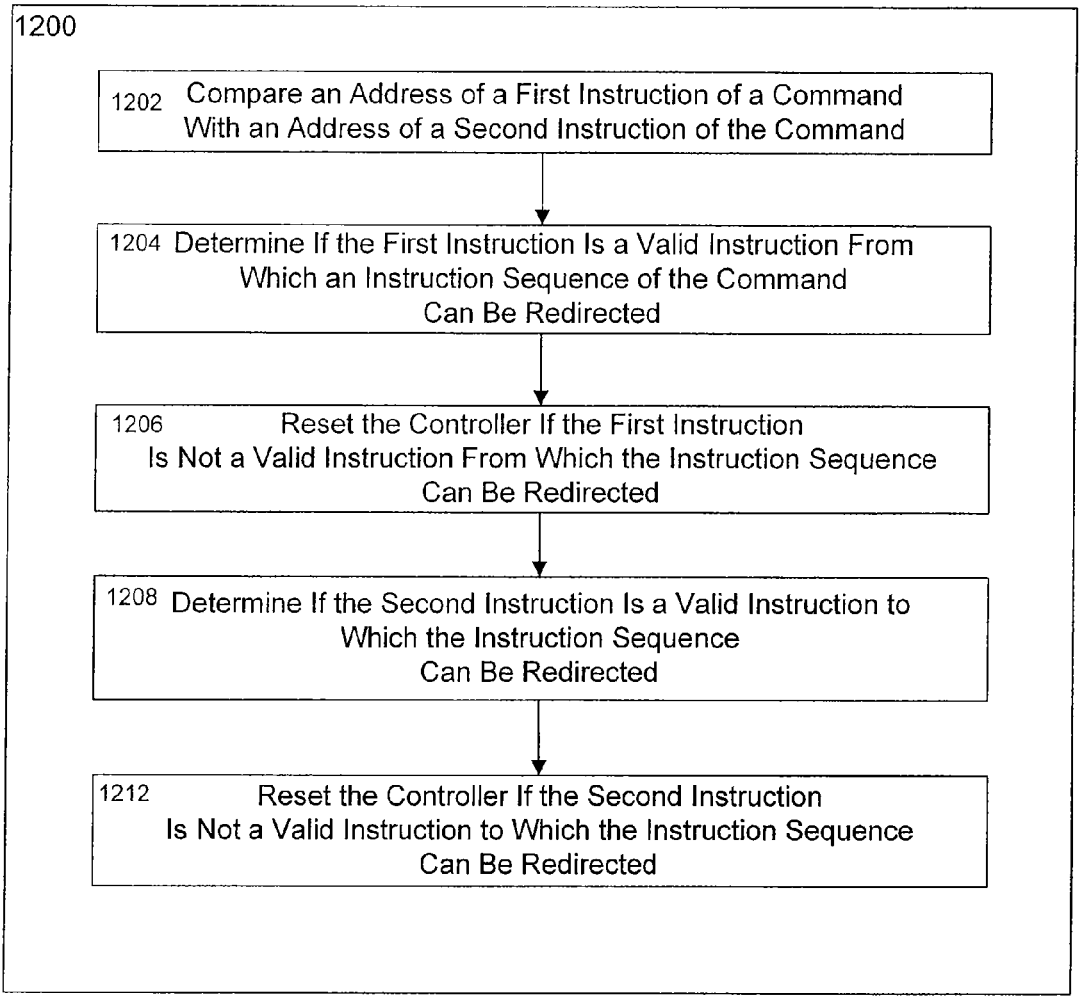
FIG. 12 is a flowchart that illustrates a method 1200 of verifying, by discontinuity detection in the manner of the present invention, a current performance of a command.

FIG. 12 is a flowchart that illustrates a method 1200 of verifying, by discontinuity detection in the manner of the present invention, a current performance of a command. In method 1200, at a step 1202, an address of a first (e.g., current) instruction of a command is compared with an address of a second (e.g., previous) instruction of the command to determine if there may be a discontinuity between the instructions. Confirmation of the discontinuity can be realized by performing one of two routines of the second procedure, or preferably both.

In the first of the two routines, at a step 1204, it is determined if the first instruction is a valid instruction from which an instruction sequence of the command can be redirected. At a step 1206, if the first instruction is not a valid instruction from which the instruction sequence can be redirected, then master controller 310 is reset.

Figure 13A:
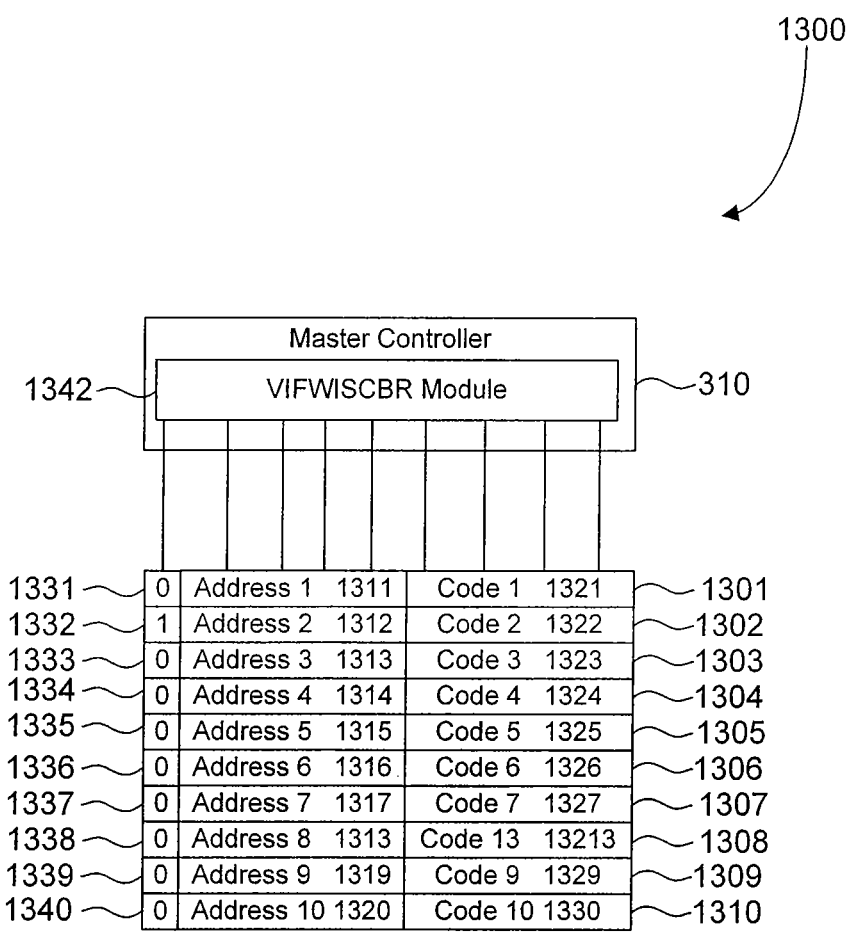
FIG. 13A illustrates a relationship between master controller 310 and a COMMAND 1300.

In some embodiments, a valid instruction from which the instruction sequence can be redirected is determined by a "valid instruction from which the instruction sequence can be redirected (VIFWISCBR) toggle bit" to indicate whether that instruction is a valid instruction from which the instruction sequence can be redirected. FIG. 13A illustrates a relationship between master controller 310 and a COMMAND 1300. In FIG. 13A, master controller 310 includes a VIFWISCBR module 1342. Each instruction of COMMAND 1300 includes a VIFWISCBR toggle bit. For example, INSTRUCTION 1 1301 includes ADDRESS 1 1311, CODE 1 1321, and VIFWISCBR TOGGLE BIT 1 1331; INSTRUCTION 2 1302 includes ADDRESS 2 1312, CODE 2 1322, and VIFWISCBR TOGGLE BIT 2 1332; etc. In this embodiment, VIFWISCBR module 1342 is configured to receive the value of the VIFWISCBR toggle bit, which is an extra bit, to determine if the instruction is a valid instruction from which the instruction sequence can be redirected. For example, because VIFWISCBR TOGGLE BIT 2 1332 has the value one, INSTRUCTION 2 1302 is identified as a valid instruction from which the instruction sequence can be redirected. Because the remaining VIFWISCBR bits each have the value zero, each of their corresponding instructions is identified as an invalid instruction from which the instruction sequence can be redirected.

Figure 13B:
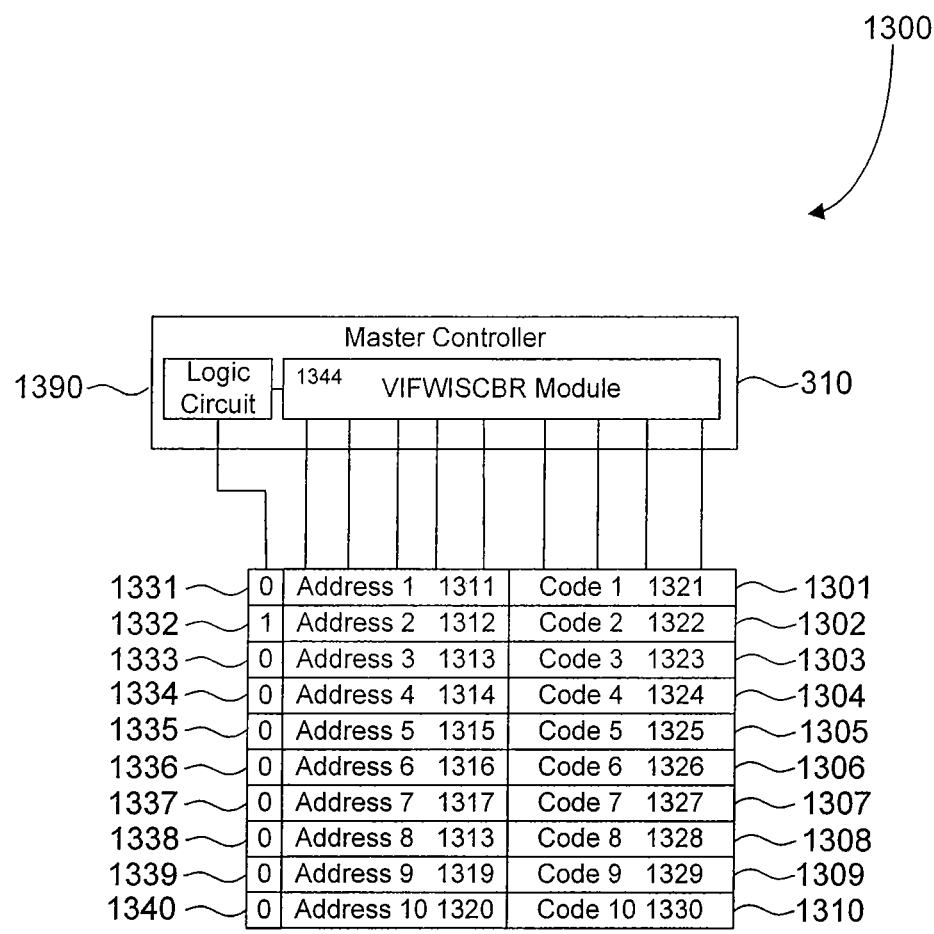
FIG. 13B illustrates another relationship between master controller 310 and COMMAND 1300.

FIG. 13B illustrates another relationship between master controller 310 and PREDICTABLE COMMAND 1300. In FIG. 13B, master controller 310 includes a VIFWISCBR module 1344 and a logic circuit 1390. In this embodiment, the value of the VIFWISCBR toggle bit is received by logic circuit 1390, which interfaces with VIFWISCBR module 1344 to determine whether the remaining portion of the corresponding instruction (e.g., instruction address and instruction code), which is received by VIFWISCBR module 1344, is a valid instruction from which the instruction sequence can be redirected.

Figure 13C:
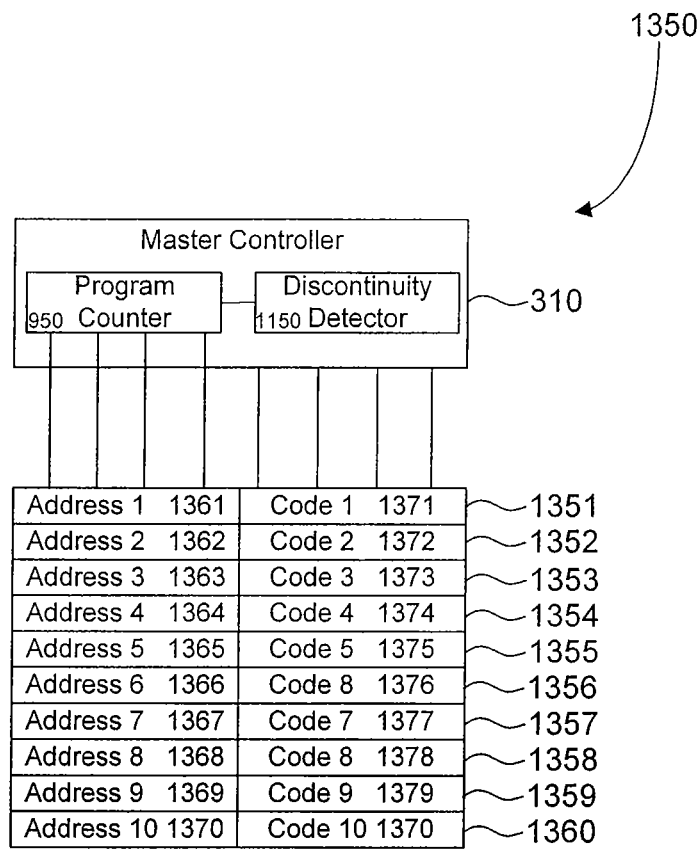
FIG. 13C illustrates a relationship between master controller 310 and a COMMAND 1350.

In another embodiment, a "valid instruction from which the instruction sequence can be redirected (VIFWISCBR) identifier" instruction is included in the instruction sequence before a valid instruction from which the instruction sequence can be redirected. Preferably, the VIFWISCBR identifier instruction is included immediately before the valid instruction from which the instruction sequence can be redirected. FIG. 13C illustrates a relationship between master controller 310 and a COMMAND 1350.

For example, INSTRUCTION 1 1351 includes ADDRESS 1 1361 and CODE 1 1371, and CODE 1 1371 is a VIFWISCBR identifier instruction. INSTRUCTION 2 1352 includes ADDRESS 2 1362 and CODE 2 1372, and CODE 2 1372 is an instruction from which the instruction sequence is redirected (for example, under certain circumstances). INSTRUCTION 3 1353 includes ADDRESS 3 1363 and CODE 3 1373. INSTRUCTION 4 1354 includes ADDRESS 4 1364 and CODE 4 1374, and CODE 4 1374 is an instruction to which the instruction sequence is redirected (for example, under certain circumstances). INSTRUCTION 5 1355 includes ADDRESS 5 1365 and CODE 5 1375. INSTRUCTION 6 1356 includes ADDRESS 6 1366 and CODE 6 1376. INSTRUCTION 7 1357 includes ADDRESS 7 1367 and CODE 7 1377. INSTRUCTION 8 1358 includes ADDRESS 8 1368 and CODE 8 1378. INSTRUCTION 9 1359 includes ADDRESS 9 1369 and CODE 9 1379. INSTRUCTION 10 1360 includes ADDRESS 10 1370 and CODE 10 1380.

For example, CODE 1 1371 of INSTRUCTION 1 1351 is a VIFWISCBR identifier instruction, which alerts master controller 310 that INSTRUCTION 2 1352 is a valid instruction from which the instruction sequence can be redirected.

The skilled artisan will recognize other mechanisms by which a current performance of a command can be verified by discontinuity detection. Therefore, the present invention is not limited to the mechanisms described above.

Returning to FIG. 12, in the second of the two routines, at a step 1208, it is determined if the second instruction is a valid instruction to which the instruction sequence can be redirected. At a step 1210, if the second instruction is not a valid instruction to which the instruction sequence can be redirected, then master controller 310 is reset.

Figure 14A:
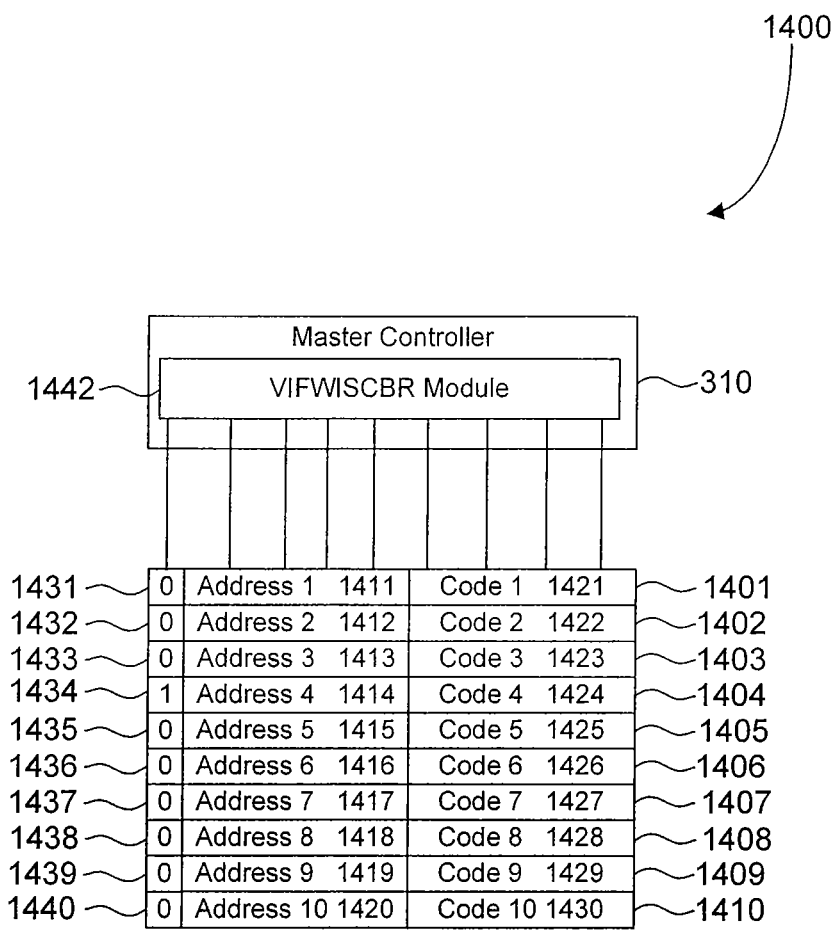
FIG. 14A illustrates a relationship between master controller 310 and a COMMAND 1400.

In some embodiments, a valid instruction to which the instruction sequence can be redirected is determined by a "valid instruction to which the instruction sequence can be redirected (VITWISCBR) toggle bit" to indicate whether that instruction is a valid instruction to which the instruction sequence can be redirected. FIG. 14A illustrates a relationship between master controller 310 and a COMMAND 1400. In FIG. 14A, master controller 310 includes a VITWISCBR module 1442. Each instruction of COMMAND 1400 includes a VITWISCBR toggle bit. For example, INSTRUCTION 1 1401 includes ADDRESS 1 1411, CODE 1 1421, and VITWISCBR TOGGLE BIT 1 1431; INSTRUCTION 2 1402 includes ADDRESS 2 1412, CODE 2 1422, and VITWISCBR TOGGLE BIT 2 1432; etc. In this embodiment, VITWISCBR module 1442 is configured to receive the value of the VITWISCBR toggle bit, which is an extra bit in the instruction, to determine if the instruction is a valid instruction to which the instruction sequence can be redirected. For example, because VITWISCBR TOGGLE BIT 4 1434 has the value one, INSTRUCTION 4 1404 is identified as a valid instruction to which the instruction sequence can be redirected. Because the remaining VITWISCBR bits each have the value zero, each of their corresponding instructions is identified as an invalid instruction to which the instruction sequence can be redirected.

Figure 14B:
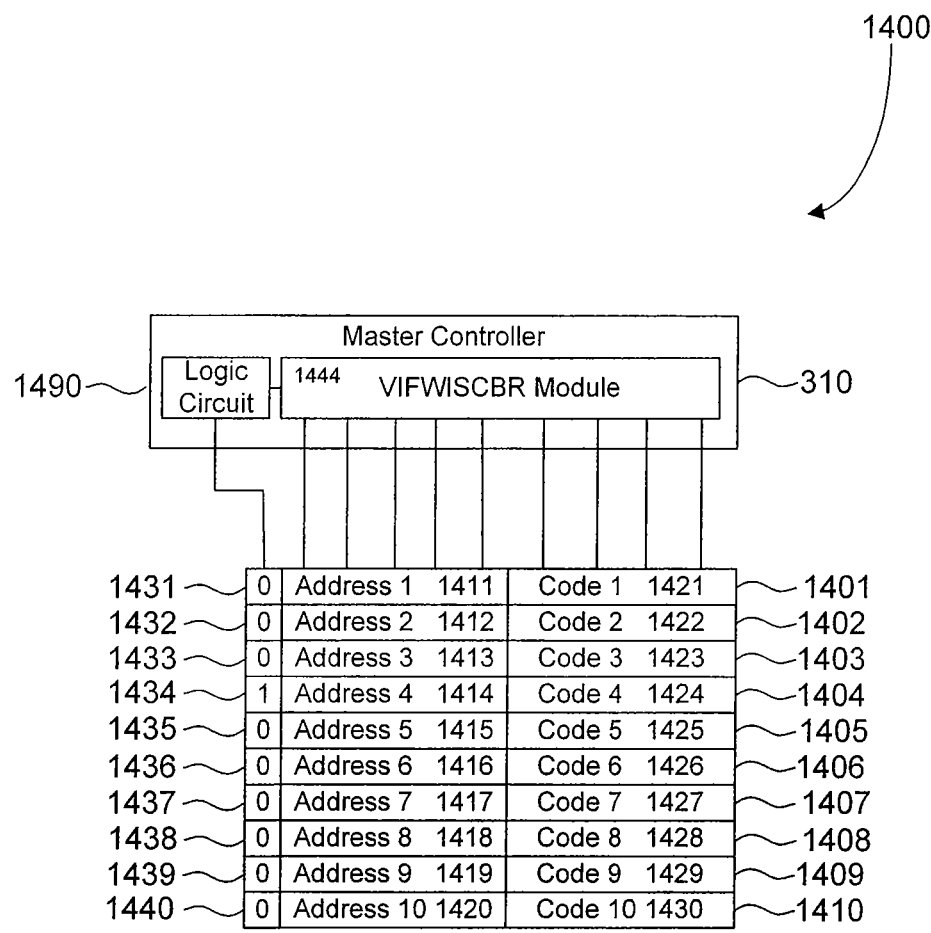
FIG. 14B illustrates another relationship between master controller 310 and COMMAND 1400.

FIG. 14B illustrates another relationship between master controller 310 and PREDICTABLE COMMAND 1400. In FIG. 14B, master controller 310 includes a VITWISCBR module 1444 and a logic circuit 1490. In this embodiment, the value of the VITWISCBR toggle bit is received by logic circuit 1490, which interfaces with VITWISCBR module 1444 to determine whether the remaining portion of the corresponding instruction (e.g., instruction address and instruction code), which is received by VITWISCBR module 1444, is a valid instruction to which the instruction sequence can be redirected.

Figure 14C:
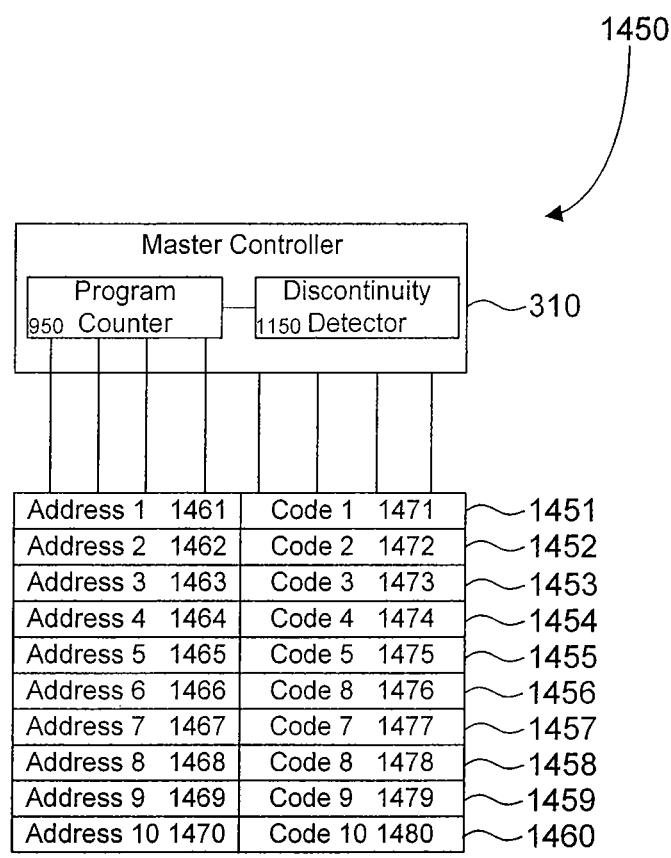
FIG. 14C illustrates a relationship between master controller 310 and a COMMAND 1450.

In another embodiment, a "valid instruction to which the instruction sequence can be redirected (VITWISCBR) identifier" instruction is included in the instruction sequence after a valid instruction to which the instruction sequence can be redirected. Preferably, the VITWISCBR identifier instruction is included immediately after the valid instruction to which the instruction sequence can be redirected. FIG. 14C illustrates a relationship between master controller 310 and a COMMAND 1450. In FIG. 14C, master controller 310 includes program counter 950 and discontinuity detector 1150.

For example, INSTRUCTION 1 1451 includes ADDRESS 1 1461 and CODE 1 1471. INSTRUCTION 2 1452 includes ADDRESS 2 1462 and CODE 2 1472, and CODE 2 1472 is an instruction from which the instruction sequence is redirected (for example, under certain circumstances). INSTRUCTION 3 1453 includes ADDRESS 3 1463 and CODE 3 1473. INSTRUCTION 4 1454 includes ADDRESS 4 1464 and CODE 4 1474, and CODE 4 1474 is an instruction to which the instruction sequence is redirected (for example, under certain circumstances). INSTRUCTION 5 1455 includes ADDRESS 5 1465 and CODE 5 1475, and CODE 5 1475 is a VITWISCBR identifier instruction. INSTRUCTION 6 1456 includes ADDRESS 6 1466 and CODE 6 1476. INSTRUCTION 7 1457 includes ADDRESS 7 1467 and CODE 7 1477. INSTRUCTION 8 1458 includes ADDRESS 8 1468 and CODE 8 1478. INSTRUCTION 9 1459 includes ADDRESS 9 1469 and CODE 9 1479. INSTRUCTION 10 1460 includes ADDRESS 10 1470 and CODE 10 1480.

For example, after INSTRUCTION 2 1452 at ADDRESS 2 1462 has been performed, master controller 310 causes program counter 950 to go to ADDRESS 4 1464 so that INSTRUCTION 4 1454 can be performed. Discontinuity detector 1150 compares the difference in the values between ADDRESS 4 1464 and ADDRESS 2 1462 and determines that there may be a discontinuity. After INSTRUCTION 4 1454 at ADDRESS 4 1464 has been performed, master controller 310 causes program counter 950 to go to ADDRESS 5 1465 so that INSTRUCTION 5 1455 can be performed. CODE 5 1475 of INSTRUCTION 5 1455 is a VITWISCBR identifier instruction, which allows master controller 310 to determine that INSTRUCTION 4 1454 is a valid instruction to which the instruction sequence can be redirected. Therefore, there is no discontinuity.

Figure 15:
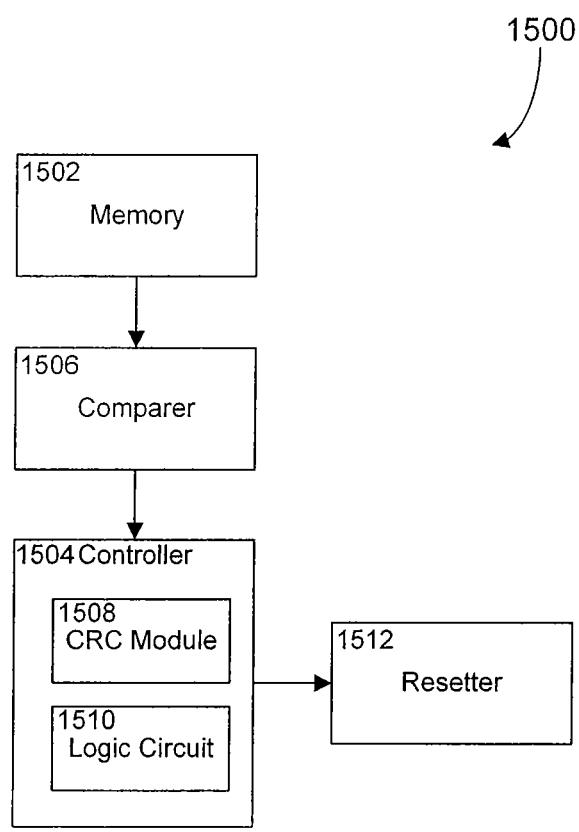
FIG. 15 is a system 1500 for verifying, with a CRC in the manner of the present invention, a current performance of a predictable command.

FIG. 15 is a system 1500 for verifying, with a CRC in the manner of the present invention, a current performance of a predictable command. System 1500 comprises a memory 1502, a controller 1504, and a comparer 1506. Memory 1502 is configured to store a first CRC for the command. Controller 1504 is configured to process instructions of the command. Controller 1504 has a CRC module 1508 configured to calculate a second CRC for the command after instructions of the command have been performed by controller 1504. In an embodiment, CRC module 1508 can be configured to receive a value for a CRC toggle bit of an instruction. In another embodiment, controller 1504 can further comprise a logic circuit 1510. Logic circuit 1510 is configured to receive a value for a CRC toggle bit of an instruction. Logic circuit 1510 is coupled to CRC module 1508. In yet another embodiment, CRC module 1508 can be configured to receive a start CRC instruction and a stop CRC instruction. Comparer 1506 is configured to compare the first CRC with the second CRC. Comparer 1506 is coupled to memory 1502 and controller 1504. System 1500 can further comprise a resetter 1512. Resetter 1512 is configured to reset controller 1504 if the first CRC does not match the second CRC. Resetter 1512 is coupled to controller 1504.

Figure 16:
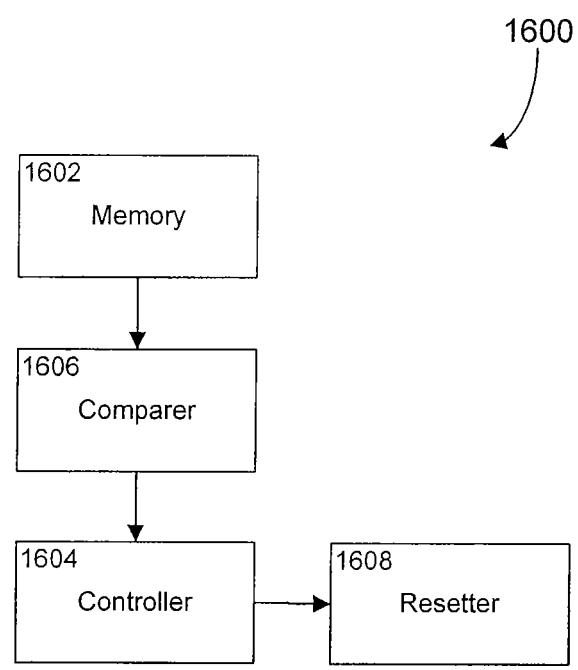
FIG. 16 is a system 1600 for verifying, by discontinuity detection in the manner of the present invention, a current performance of a command.

FIG. 16 is a system 1600 for verifying, by discontinuity detection in the manner of the present invention, a current performance of a command. System 1600 comprises a memory 1602, a controller 1604, and a comparer 1606. Memory 1602 is configured to store an address of a first instruction of the command and an address of a second instruction of the command. Controller 1604 is configured to determine if the first instruction is a VIFWISCBR. In an embodiment, controller 1604 can be configured to check a value of a VIFWISCBR toggle bit of the first instruction. In another embodiment, controller 1604 can be configured to determine if a third instruction of the command is a VIFWISCBR identifier instruction. Comparer 1606 is configured to compare the address of the first instruction with the address of the second instruction. Comparer 1606 is coupled to memory 1602 and controller 1604. System 1600 can further comprise a resetter 1608. Resetter 1608 is configured to reset controller 1604 if the first instruction is not a VIFWISCBR. Resetter 1608 is coupled to controller 1604.

Figure 17:
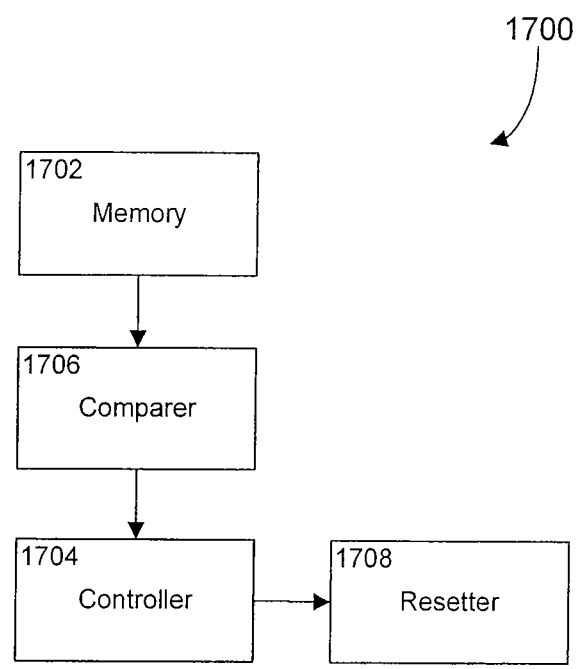
FIG. 17 is another system 1700 for verifying, by discontinuity detection in the manner of the present invention, a current performance of a command.

FIG. 17 is another system 1700 for verifying, by discontinuity detection in the manner of the present invention, a current performance of a command. System 1700 comprises a memory 1702, a controller 1704, and a comparer 1706. Memory 1702 is configured to store an address of a first instruction of the command and an address of a second instruction of the command. Controller 1704 is configured to determine if the first instruction is a VITWISCBR. In an embodiment, controller 1704 can be configured to check a value of a VITWISCBR toggle bit of the first instruction. In another embodiment, controller 1704 can be configured to determine if a third instruction of the command is a VITWISCBR identifier instruction. Comparer 1706 is configured to compare the address of the first instruction with the address of the second instruction. Comparer 1706 is coupled to memory 1702 and controller 1704. System 1700 can further comprise a resetter 1708. Resetter 1708 is configured to reset controller 1704 if the first instruction is not a VITWISCBR. Resetter 1708 is coupled to controller 1704.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for verifying a performance of a command by a controller, comprising:
    processing instructions of the command, the instructions are associated with plurality of bits indicating that the instructions correspond to the command;
    determining an error-detecting code for the command; and
    determining whether the error-detecting code matches a precalculated code for the command stored in memory.

2. The method of claim 1, further comprising:
    initiating a reset of the controller if the error-detecting code does not match the precalculated code.

3. The method of claim 1, wherein the precalculated code is a cyclic redundancy check.

4. The method of claim 1, wherein the error-detecting code and the precalculated code are functions of addresses of the instructions.

5. The method of claim 1, wherein the plurality of bits comprise plurality of toggle bits associated with the instructions that indicate whether each instruction is used for determining the error-detecting code.

6. The method of claim 1, wherein a position of a first instruction between a second instruction and a third instruction indicates that the first instruction is used for determining the error-detecting code.

7. The method of claim 1, wherein the precalculated code indicates a known performance of the command.

8. The method of claim 1, wherein the precalculated code indicates a known performance of an error handler instruction for the command.

9. The method of claim 8, further comprising performing the error handler instruction, wherein performing the error handler instruction comprises:
    resetting the error-detecting code;
    jumping to an address of the error handler instruction; and
    determining a new value for the error-detecting code after the error handler instruction has been performed.

10. A method for verifying a performance of a command by a controller, comprising:
    processing instructions of the command, wherein the instructions are associated with a plurality of bits indicating that the instructions correspond to the command; and
    identifying a discontinuity between a first instruction of the command and a second instruction of the command by comparing a first toggle bit of the first instruction with a second toggle bit of the second instruction.

11. The method of claim 10, wherein a value of the first toggle bit indicates if the first instruction is a valid instruction from which an instruction sequence of the command can be redirected.

12. A method for verifying a performance of a command by a controller, comprising:
    processing instructions of the command, wherein the instructions are associated with a plurality of bits indicating that the instructions correspond to the command; and
    identifying a discontinuity between a first instruction of the command and a second instruction of the command by comparing a first toggle bit of the first instruction and a second toggle bit of the second instruction with a third toggle bit of a third instruction included in an instruction sequence before the first instruction.

13. The method of claim 12, wherein the third instruction indicates if one of the first instruction and the second instruction is a valid instruction from which an instruction sequence of the command can be redirected.

14. A trusted platform (TPM), comprising:
    a memory configured to store a plurality of precalculated codes corresponding to a respective plurality of commands:
    a controller coupled to the memory, wherein the controller is configured to:
        process instructions for a first command in the plurality of commands, wherein the instructions are associated with a plurality of bits indicating that the instructions correspond to the first command, and
        determine a first error-detecting code for the first command;
    a comparer coupled to the controller wherein the comparer is configured to determine whether the first error-detecting code matches a first precalculated code in the plurality of precalculated codes that corresponds to the first command; and
    resetter coupled to the controller, wherein the resetter is configured to initiate a reset of the controller if the first precalculated code does not match the first error-detecting code.

15. The TPM of claim 14, wherein each bit in the plurality of bits is a toggle bit identifying, a respective instruction in the plurality of instructions as being associated with the first command.

16. A system for verifying a performance of a command, comprising:
    a memory configured to store a first instruction of the command and a second instruction of the command; and
    a controller coupled to the memory and configured to identify a discontinuity between the first instruction and the second instruction by comparing a first toggle bit of the first instruction with a second toggle bit of the second instruction.

17. A trusted platform module (TPM), comprising:
    a memory configured to store a plurality of precalculated outputs corresponding to a respective plurality of commands;
    a controller coupled to the memory, wherein the controller is configured to:
        receive a first command,
        process instructions for the first command, wherein processing instructions for the first command produces secured data, and wherein the instructions are associated with a plurality of bits indicating that the instructions correspond to the first command, and
        determine a first error-detecting code for the first command;
    a comparer coupled to the controller, wherein the comparer is configured to determine whether the first error-detecting code matches a first precalculated output in the plurality of precalculated outputs that corresponds to the first command; and a resetter coupled to the controller, wherein the resetter is configured to initiate a reset of the controller if the first precalculated output does not match the first error-detecting code.

18. The TPM of claim 17, wherein the TPM is configured to ensure that an exit sequence is not performed after the first command is processed but before the secured data is removed from a data buffer of the TPM.

19. The TPM of claim 17, wherein the TPM is configured to ensure that the instructions for the first command are performed in a correct sequence by the controller.

20. The TPM of claim 17, wherein each bit in the plurality of bits is a toggle bit identifying a respective instruction as being associated with the first command.

* * * * *

UNITED STATES PATENT AND TRADEMARK OFFICE
CERTIFICATE OF CORRECTION

PATENT NO. : 8,433,956 B2  
APPLICATION NO. : 12/020991  
DATED : April 30, 2013  
INVENTOR(S) : Timothy R. Paaske It is certified that error appears in the above-identified patent and that said Letters Patent is hereby corrected as shown below:

In the Claims

Column 16, Line 17, please replace "trusted platform (TPM)" with -- trusted platform module (TPM) --.

Column 16, Lines 19-20, please replace "commands:" with -- commands; --.

Column 16, Line 40, please replace "identifying," with -- identifying --.

Signed and Sealed this
Twentieth Day of May, 2014

Michelle K. Lee
*Deputy Director of the United States Patent and Trademark Office*